(12) United States Patent
Ly et al.

(10) Patent No.: US 12,542,589 B2
(45) Date of Patent: Feb. 3, 2026

(54) APERIODIC CHANNEL STATE INFORMATION PHYSICAL UPLINK SHARED CHANNEL REPETITION WITH DEMODULATION REFERENCE SIGNAL BUNDLING

(71) Applicant: QUALCOMM Incorporated, San Diego, CA (US)

(72) Inventors: Hung Dinh Ly, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/734,911

(22) Filed: Jun. 5, 2024

(65) Prior Publication Data

US 2024/0322884 A1  Sep. 26, 2024

Related U.S. Application Data

(62) Division of application No. 17/123,680, filed on Dec. 16, 2020, now Pat. No. 12,040,866.
(Continued)

(51) Int. Cl.
*H04B 7/06* (2006.01)
*H04L 1/08* (2006.01)
(Continued)

(52) U.S. Cl.
CPC ............ *H04B 7/0626* (2013.01); *H04L 1/08* (2013.01); *H04L 5/0048* (2013.01); *H04L 5/005* (2013.01);
(Continued)

(58) Field of Classification Search
CPC ....... H04B 7/0626; H04L 1/08; H04L 5/0048; H04L 5/005; H04L 5/0094;
(Continued)

(56) References Cited

U.S. PATENT DOCUMENTS

2014/0010126 A1  1/2014  Sayana et al.
2015/0085787 A1  3/2015  Ouchi
(Continued)

FOREIGN PATENT DOCUMENTS

CN  109462425 A  3/2019
EP  2922225 A1  9/2015
(Continued)

OTHER PUBLICATIONS

International Preliminary Report on Patentability - PCT/US2020/065741 The International Bureau of WIPO - Geneva, Switzerland, 2022-06-30.
(Continued)

*Primary Examiner* — Yu-Wen Chang

(74) *Attorney, Agent, or Firm* — Holland & Hart LLP

(57) ABSTRACT

Methods, systems, and devices for wireless communications are described. A device may receive signaling including a channel state information (CSI) reporting configuration. The device may determine one or more resources of a physical uplink channel for aperiodic CSI reporting based on the CSI reporting configuration and transmit an aperiodic CSI report over the physical uplink channel based on the on the one or more resources. In some examples, the device may also determine a set of demodulation reference signal (DMRS) symbols associated with a hop of a set of hops in a time domain or a frequency domain, and coherently transmit, based on the determining, the set of DMRS symbols associated with the hop of the set of hops.

20 Claims, 23 Drawing Sheets

Related U.S. Application Data

(60) Provisional application No. 62/950,026, filed on Dec. 18, 2019.

(51) Int. Cl.

| | | |
|---|---|---|
| *H04L 5/00* | (2006.01) | |
| *H04L 25/02* | (2006.01) | |
| *H04L 27/227* | (2006.01) | |
| *H04L 27/32* | (2006.01) | |
| *H04W 72/0446* | (2023.01) | |
| *H04W 72/0453* | (2023.01) | |
| *H04W 72/23* | (2023.01) | |
| *H04L 27/26* | (2006.01) | |

(52) U.S. Cl.
CPC ........ *H04L 5/0094* (2013.01); *H04L 25/0224* (2013.01); *H04L 27/227* (2013.01); *H04L 27/32* (2013.01); *H04W 72/0446* (2013.01); *H04W 72/0453* (2013.01); *H04W 72/23* (2023.01); *H04L 27/2601* (2013.01)

(58) Field of Classification Search
CPC ... H04L 25/0224; H04L 27/227; H04L 27/32; H04L 27/2601; H04L 5/0051; H04L 5/0057; H04L 5/001; H04L 1/0026; H04L 1/0027; H04L 1/18; H04W 72/0446; H04W 72/0453; H04W 72/23; H04W 72/20; H04W 72/542
See application file for complete search history.

(56) References Cited

U.S. PATENT DOCUMENTS

| | | | |
|---|---|---|---|
| 2019/0115964 A1* | 4/2019 | Yum | ................. H04W 72/0446 |
| 2019/0123864 A1 | 4/2019 | Zhang et al. | |
| 2019/0159136 A1 | 5/2019 | Molavianjazi et al. | |
| 2019/0215086 A1 | 7/2019 | Kwak et al. | |
| 2019/0215823 A1* | 7/2019 | Kim | ..................... H04L 1/0031 |
| 2019/0222399 A1 | 7/2019 | Huang et al. | |
| 2020/0037347 A1 | 1/2020 | Yang et al. | |
| 2020/0059867 A1 | 2/2020 | Haghighat et al. | |
| 2020/0077432 A1 | 3/2020 | Xiong et al. | |
| 2020/0204314 A1 | 6/2020 | Kang et al. | |
| 2020/0221474 A1 | 7/2020 | Lee et al. | |
| 2021/0006315 A1 | 1/2021 | Wu et al. | |
| 2021/0014095 A1 | 1/2021 | Ly et al. | |
| 2021/0021454 A1 | 1/2021 | Horiuchi et al. | |
| 2021/0029733 A1* | 1/2021 | Takeda | .................. H04W 24/10 |
| 2021/0037526 A1 | 2/2021 | Takeda et al. | |
| 2021/0194556 A1 | 6/2021 | Ly et al. | |
| 2021/0258966 A1* | 8/2021 | Yoshioka | .............. H04L 1/1858 |
| 2021/0282170 A1 | 9/2021 | Falconetti et al. | |
| 2021/0410124 A1* | 12/2021 | Chen | ..................... H04L 5/0091 |
| 2022/0183017 A1 | 6/2022 | Wu et al. | |
| 2022/0304017 A1* | 9/2022 | Khoshnevisan | ...... H04L 5/0092 |
| 2023/0126986 A1* | 4/2023 | Hao | ....................... H04W 72/54 370/329 |
| 2023/0284212 A1* | 9/2023 | Ibrahim | ................... H04L 5/14 370/329 |

FOREIGN PATENT DOCUMENTS

| | | |
|---|---|---|
| EP | 3041154 A1 | 7/2016 |
| EP | 3509241 A1 | 7/2019 |
| EP | 3761736 A1 | 1/2021 |
| WO | WO2016027556 A1 | 2/2016 |
| WO | WO2019159245 A1 | 8/2019 |
| WO | WO-2019167939 A1 | 9/2019 |
| WO | WO2019183827 A1 | 10/2019 |
| WO | WO2021031090 A1 | 2/2021 |

OTHER PUBLICATIONS

International Search Report and Written Opinion - PCT/US2020/065741 - ISA/EPO - 2021-05-19.

Partial International Search Report - PCT/US2020/065741 - ISA/EPO - 2021- 03-24.

Ericsson: "PUSCH Link Performance for MTC", R1-153734, 3rd Generation Partnership Project, Mobile Competence Centre, 650, Route Des Lucioles, F-06921 Sophia-antipolis Cedex, France, vol. RAN WG1, No. Beijing, China, Aug. 24, 2015-Aug. 28, 2015, Aug. 23, 2015, XP051001182, 5 Pages, the whole document.

* cited by examiner

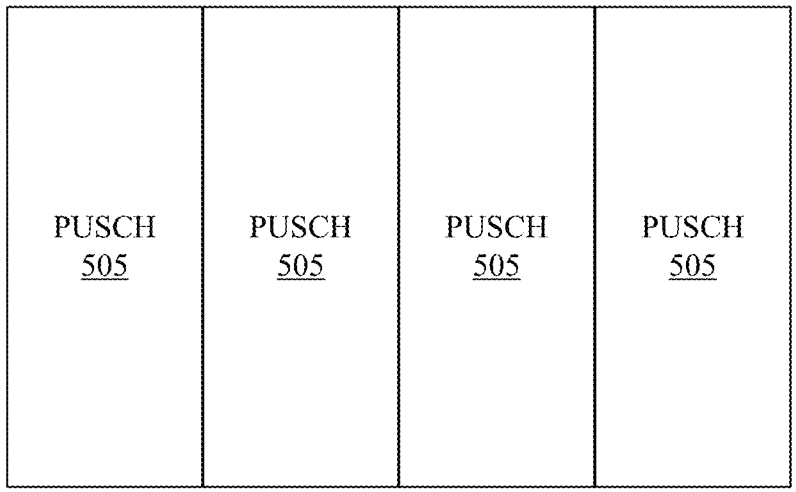
Time
FIG. 5

APERIODIC CHANNEL STATE INFORMATION PHYSICAL UPLINK SHARED CHANNEL REPETITION WITH DEMODULATION REFERENCE SIGNAL BUNDLING

CROSS REFERENCE

The present Application for Patent is a Divisional of U.S. patent application Ser. No. 17/123,680 by L Y et al., entitled "APERIODIC CHANNEL STATE INFORMATION PHYSICAL UPLINK SHARED CHANNEL REPETITION WITH DEMODULATION REFERENCE SIGNAL" filed Dec. 16, 2020, which claims the benefit of U.S. Provisional Patent Application No. 62/950,026 by L Y et al., entitled "PHYSICAL UPLINK SHARED CHANNELS CARRYING APERIODIC CHANNEL STATE INFORMATION REPORTS," filed Dec. 18, 2019, each of which are assigned to the assignee hereof, and each of which are expressly incorporated by reference herein.

FIELD OF TECHNOLOGY

The following relates generally to wireless communications and more specifically to aperiodic channel state information (CSI) physical uplink shared channel (PUSCH) repetition with demodulation reference signal (DMRS) bundling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support channel state information (CSI) operations. These communications systems may also support demodulation reference signal (DMRS) bundling operations. As demand for communication efficiency increases, some wireless communications systems, may fail to provide satisfactory CSI operations and DMRS bundling operations, and as a result, may be unable to support high reliability or low latency communications, among other examples.

SUMMARY

Various aspects of the described techniques relate to configuring a communication device, which may be a user equipment (UE), to support providing aperiodic channel state information (CSI) reports on physical uplink shared channels (PUSCHs) in wireless communications systems. The described techniques may be used to configure the communication device with a CSI reporting configuration (e.g., a PUSCH repetition configuration, a PUSCH (re)transmission configuration), such that the communication device may extend PUSCH coverage for aperiodic CSI reports. Additionally, the described techniques may be used to configure the communication device to support PUSCH DMRS bundling operations for PUSCH repetition or PUSCH (re)transmission, or both. As such, the PUSCH DMRS can be coherently provided to the communication device, which may be configured to determine channel estimation from the bundled PUSCH DMRS to enhance channel estimation for PUSCH repetition or PUSCH (re) transmission, or both. The communication device may thus be configured to support improvements to CSI operations and DMRS bundling operations in fifth generation (5G) systems. The described techniques may include features for improvements to power consumption and, in some examples, may promote enhanced efficiency for high reliability and low latency operations in 5G systems, among other benefits.

A method of wireless communication at a UE is described. The method may include receiving signaling including a CSI reporting configuration, determining one or more resources of a physical uplink channel for aperiodic CSI reporting based on the CSI reporting configuration, and transmitting an aperiodic CSI report over the physical uplink channel based on the on the one or more resources.

An apparatus for wireless communication is described. The apparatus may include a processor, memory coupled with the processor, and instructions stored in the memory. The instructions may be executable by the processor to cause the apparatus to receive signaling including a CSI reporting configuration, determine one or more resources of a physical uplink channel for aperiodic CSI reporting based on the CSI reporting configuration, and transmit an aperiodic CSI report over the physical uplink channel based on the on the one or more resources.

Another apparatus for wireless communication is described. The apparatus may include means for receiving signaling including a CSI reporting configuration, determining one or more resources of a physical uplink channel for aperiodic CSI reporting based on the CSI reporting configuration, and transmitting an aperiodic CSI report over the physical uplink channel based on the on the one or more resources.

A non-transitory computer-readable medium storing code for wireless communication at a UE is described. The code may include instructions executable by a processor to receive signaling including a CSI reporting configuration, determine one or more resources of a physical uplink channel for aperiodic CSI reporting based on the CSI reporting configuration, and transmit an aperiodic CSI report over the physical uplink channel based on the on the one or more resources.

In some examples of the method, apparatuses, and non-transitory computer-readable medium described herein, the CSI reporting configuration includes one or more of a PUSCH repetition configuration or a PUSCH re-transmission configuration, the PUSCH repetition configuration comprising a number of PUSCH repetitions and a starting of a symbol in each slot associated with the number of PUSCH repetitions.

In some examples of the method, apparatuses, and non-transitory computer-readable medium described herein, the CSI reporting configuration includes a PUSCH repetition configuration. In some examples of the method, apparatuses, and non-transitory computer-readable medium described herein may include operations, features, means, or instructions for determining the one or more resources of the physical uplink channel based on the PUSCH repetition configuration.

Some examples of the method, apparatuses, and non-transitory computer-readable medium described herein may further include operations, features, means, or instructions for determining a PUSCH repetition based on the PUSCH repetition configuration, where transmitting the aperiodic CSI report includes transmitting the aperiodic CSI report over the physical uplink channel according to the PUSCH repetition.

In some examples of the method, apparatuses, and non-transitory computer-readable medium described herein, the PUSCH repetition includes a repetition of the physical uplink channel over the one or more resources including mini-slots or slots.

In some examples of the method, apparatuses, and non-transitory computer-readable medium described herein, the repetition of the physical uplink channel over the one or more resources may be consecutive.

In some examples of the method, apparatuses, and non-transitory computer-readable medium described herein, the repetition of the physical uplink channel over the one or more resources may be nonconsecutive.

Some examples of the method, apparatuses, and non-transitory computer-readable medium described herein may further include operations, features, means, or instructions for determining a payload size of the aperiodic CSI report, and determining that the payload size of the aperiodic CSI report satisfies a threshold, where transmitting the aperiodic CSI report includes transmitting the aperiodic CSI over the physical uplink channel according to the PUSCH repetition configuration based on the payload size of the aperiodic CSI report satisfying the threshold.

In some examples of the method, apparatuses, and non-transitory computer-readable medium described herein, the threshold includes a coding rate for the aperiodic CSI report.

Some examples of the method, apparatuses, and non-transitory computer-readable medium described herein may further include operations, features, means, or instructions for identifying a bit indication in a radio resource control (RRC) configuration or in a downlink control information (DCI) message, and determining, based on the bit indication, a number of component carriers for the aperiodic CSI reporting and a repetition factor associated with the aperiodic CSI reporting, where transmitting the aperiodic CSI report includes transmitting the aperiodic CSI over the physical uplink channel according to the number of component carriers and the repetition factor.

In some examples of the method, apparatuses, and non-transitory computer-readable medium described herein, the bit indication includes a multibit indication.

Some examples of the method, apparatuses, and non-transitory computer-readable medium described herein may further include operations, features, means, or instructions for receiving a control message including an indication of a component carrier for the aperiodic CSI report, and determining a PUSCH repetition based on the PUSCH repetition configuration, where transmitting the aperiodic CSI report includes transmitting the aperiodic CSI report includes transmitting the aperiodic CSI report over the physical uplink channel on the component carrier according to the PUSCH repetition, wherein the PUSCH repetition is transmitted on the component carrier.

Some examples of the method, apparatuses, and non-transitory computer-readable medium described herein may further include operations, features, means, or instructions for receiving a control message including an indication of one or more component carriers for the aperiodic CSI report, and determining a PUSCH repetition based on the PUSCH repetition configuration, where transmitting the aperiodic CSI report includes transmitting the aperiodic CSI report over the physical uplink channel on the one or more component carriers according to the PUSCH repetition, where a first PUSCH repetition is transmitted on a first component carrier of the one or more component carriers and a second PUSCH repetition is transmitted on a second component carrier of the one or more component carriers.

In some examples of the method, apparatuses, and non-transitory computer-readable medium described herein, the second component carrier may be different from the first component carrier.

In some examples of the method, apparatuses, and non-transitory computer-readable medium described herein, the first component carrier and the second component carrier correspond to consecutive mini-slots or slots.

In some examples of the method, apparatuses, and non-transitory computer-readable medium described herein, the first component carrier and the second component carrier correspond to nonconsecutive mini-slots or slots.

In some examples of the method, apparatuses, and non-transitory computer-readable medium described herein, the CSI reporting configuration includes a PUSCH re-transmission configuration. Some examples of the method, apparatuses, and non-transitory computer-readable medium described herein may further include operations, features, means, or instructions for determining the one or more resources of the physical uplink channel based on the PUSCH re-transmission configuration.

Some examples of the method, apparatuses, and non-transitory computer-readable medium described herein may further include operations, features, means, or instructions for receiving a feedback message associated with the aperiodic CSI report based on the transmitting, and retransmitting, based on the feedback message, the aperiodic CSI report over the physical uplink channel according to the PUSCH re-transmission configuration.

Some examples of the method, apparatuses, and non-transitory computer-readable medium described herein may further include operations, features, means, or instructions for receiving a second signaling including a second CSI reporting configuration for periodic CSI reporting or semi-persistent CSI reporting, and transmitting, based on the feedback message, a periodic CSI report or a semi-persistent CSI report according to the second CSI reporting configuration.

Some examples of the method, apparatuses, and non-transitory computer-readable medium described herein may further include operations, features, means, or instructions for receiving a control message including an indication of a component carrier for the aperiodic CSI report, where transmitting the aperiodic CSI report includes transmitting the aperiodic CSI report over the physical uplink channel and on the component carrier indicated in the control message.

Some examples of the method, apparatuses, and non-transitory computer-readable medium described herein may further include operations, features, means, or instructions for retransmitting, based on the feedback message, the aperiodic CSI report on the component carrier indicated in the control message.

Some examples of the method, apparatuses, and non-transitory computer-readable medium described herein may further include operations, features, means, or instructions for retransmitting, based on the feedback message, the aperiodic CSI report on a different component carrier from the component carrier indicated in the control message.

Some examples of the method, apparatuses, and non-transitory computer-readable medium described herein may further include operations, features, means, or instructions for determining to transmit the aperiodic CSI report on the physical uplink channel based on the CSI reporting configuration, the physical uplink channel including a PUSCH, where transmitting the aperiodic CSI report includes transmitting the aperiodic CSI report on the PUSCH based at least in part on the determining.

Some examples of the method, apparatuses, and non-transitory computer-readable medium described herein may further include operations, features, means, or instructions for determining that the PUSCH may be configured to exclusively carry the aperiodic CSI report based on the CSI reporting configuration.

In some examples of the method, apparatuses, and non-transitory computer-readable medium described herein, transmitting the aperiodic CSI report may include operations, features, means, or instructions for transmitting the aperiodic CSI report exclusively on the PUSCH, identifying that the UE may be not configured with PUSCH repetition or PUSCH re-transmission, or both when the physical uplink channel may be scheduled to carry the aperiodic CSI report and a transport channel, where the transport channel includes an uplink shared channel, and refraining from transmitting the transport channel on the PUSCH based on the identifying.

Some examples of the method, apparatuses, and non-transitory computer-readable medium described herein may further include operations, features, means, or instructions for determining that the PUSCH may be configured to jointly carry the aperiodic CSI report and a transport channel, where the transport channel includes an uplink shared channel.

In some examples of the method, apparatuses, and non-transitory computer-readable medium described herein, transmitting the aperiodic CSI report may include operations, features, means, or instructions for transmitting jointly the aperiodic CSI report and the uplink shared channel on the PUSCH.

In some examples of the method, apparatuses, and non-transitory computer-readable medium described herein, the signaling includes RRC signaling.

In some examples of the method, apparatuses, and non-transitory computer-readable medium described herein, the signaling includes downlink control signaling.

In some examples of the method, apparatuses, and non-transitory computer-readable medium described herein, the signaling includes MAC-CE signaling.

In some examples of the method, apparatuses, and non-transitory computer-readable medium described herein, the one or more resources of the physical uplink channel includes one or more mini-slots.

In some examples of the method, apparatuses, and non-transitory computer-readable medium described herein, the one or more resources of the physical uplink channel includes one or more slots.

A method of wireless communication at a base station is described. The method may include determining one or more resources of a physical uplink channel for aperiodic CSI reporting, transmitting signaling including a CSI reporting configuration including an indication of the one or more resources of the physical uplink channel for the aperiodic CSI reporting, and receiving an aperiodic CSI report based on the transmitting.

An apparatus for wireless communication is described. The apparatus may include a processor, memory coupled with the processor, and instructions stored in the memory. The instructions may be executable by the processor to cause the apparatus to determine one or more resources of a physical uplink channel for aperiodic CSI reporting, transmit signaling including a CSI reporting configuration including an indication of the one or more resources of the physical uplink channel for the aperiodic CSI reporting, and receive an aperiodic CSI report based on the transmitting.

Another apparatus for wireless communication is described. The apparatus may include means for determining one or more resources of a physical uplink channel for aperiodic CSI reporting, transmitting signaling including a CSI reporting configuration including an indication of the one or more resources of the physical uplink channel for the aperiodic CSI reporting, and receiving an aperiodic CSI report based on the transmitting.

A non-transitory computer-readable medium storing code for wireless communication at a base station is described. The code may include instructions executable by a processor to determine one or more resources of a physical uplink channel for aperiodic CSI reporting, transmit signaling including a CSI reporting configuration including an indication of the one or more resources of the physical uplink channel for the aperiodic CSI reporting, and receive an aperiodic CSI report based on the transmitting.

In some examples of the method, apparatuses, and non-transitory computer-readable medium described herein, the CSI reporting configuration includes one or more of a PUSCH repetition configuration or a PUSCH re-transmission configuration.

In some examples of the method, apparatuses, and non-transitory computer-readable medium described herein, the PUSCH repetition configuration corresponds to a PUSCH repetition associated with the physical uplink channel.

In some examples of the method, apparatuses, and non-transitory computer-readable medium described herein, the PUSCH repetition includes a repetition of the PUSCH over the one or more resources including mini-slots or slots.

In some examples of the method, apparatuses, and non-transitory computer-readable medium described herein, the repetition of the PUSCH over the one or more resources may be consecutive.

In some examples of the method, apparatuses, and non-transitory computer-readable medium described herein, the repetition of the PUSCH over the one or more resources may be nonconsecutive.

Some examples of the method, apparatuses, and non-transitory computer-readable medium described herein may further include operations, features, means, or instructions for transmitting a control message including a second indication of one or more component carriers for the aperiodic CSI report.

Some examples of the method, apparatuses, and non-transitory computer-readable medium described herein may further include operations, features, means, or instructions for transmitting a feedback message associated with the aperiodic CSI report based on the receiving, and receiving a re-transmission of the aperiodic CSI report based on the feedback message.

Some examples of the method, apparatuses, and non-transitory computer-readable medium described herein may further include operations, features, means, or instructions for transmitting a second signaling including a second CSI reporting configuration for periodic CSI reporting or semi-persistent CSI reporting, and receiving, based on the feedback message, a periodic CSI report or a semi-persistent CSI report according to the second CSI reporting configuration.

Some examples of the method, apparatuses, and non-transitory computer-readable medium described herein may further include operations, features, means, or instructions for transmitting a control message including a second indication of a component carrier for the aperiodic CSI report, where receiving the aperiodic CSI report includes receiving the aperiodic CSI report on the component carrier indicated in the control message.

Some examples of the method, apparatuses, and non-transitory computer-readable medium described herein may further include operations, features, means, or instructions for receiving the aperiodic CSI report exclusively on the PUSCH.

Some examples of the method, apparatuses, and non-transitory computer-readable medium described herein may further include operations, features, means, or instructions for receiving jointly the aperiodic CSI report and an uplink shared channel on the PUSCH.

In some examples of the method, apparatuses, and non-transitory computer-readable medium described herein, the signaling includes RRC signaling.

In some examples of the method, apparatuses, and non-transitory computer-readable medium described herein, the signaling includes downlink control signaling.

In some examples of the method, apparatuses, and non-transitory computer-readable medium described herein, the signaling includes MAC-CE signaling.

In some examples of the method, apparatuses, and non-transitory computer-readable medium described herein, the one or more resources of the physical uplink channel includes one or more mini-slots.

In some examples of the method, apparatuses, and non-transitory computer-readable medium described herein, the one or more resources of the physical uplink channel includes one or more slots.

A method of wireless communication at a UE is described. The method may include determining a set of DMRS symbols associated with a hop of a set of hops in a time domain or a frequency domain and coherently transmitting, based on the determining, the set of DMRS symbols associated with the hop of the set of hops.

An apparatus for wireless communication is described. The apparatus may include a processor, memory coupled with the processor, and instructions stored in the memory. The instructions may be executable by the processor to cause the apparatus to determine a set of DMRS symbols associated with a hop of a set of hops in a time domain or a frequency domain and coherently transmit, based on the determining, the set of DMRS symbols associated with the hop of the set of hops.

Another apparatus for wireless communication at a UE is described. The apparatus may include means for determining a set of DMRS symbols associated with a hop of a set of hops in a time domain or a frequency domain and coherently transmitting, based on the determining, the set of DMRS symbols associated with the hop of the set of hops.

A non-transitory computer-readable medium storing code for wireless communication at a UE is described. The code may include instructions executable by a processor to determine a set of DMRS symbols associated with a hop of a set of hops in a time domain or a frequency domain and coherently transmit, based on the determining, the set of DMRS symbols associated with the hop of the set of hops.

Some examples of the method, apparatuses, and non-transitory computer-readable medium described herein may further include operations, features, means, or instructions for receiving signaling including an indication of a set of resources of one or more physical uplink channels associated with the hop of the set of hops in the time domain or the frequency domain wherein the UE coherently transmits the one or more physical uplink channels, wherein the set of DMRS symbols associated with the hop of the set of hops correspond to the one or more physical uplink channels, where determining the set of DMRS symbols may be based on the indication.

Some examples of the method, apparatuses, and non-transitory computer-readable medium described herein may further include operations, features, means, or instructions for determining the set of resources of the one or more physical uplink channels associated with the hop of the set of hops in the time domain or the frequency domain based at least in part on the indication, wherein the one or more physical uplink channels and one or more DMRS are time division multiplexed or frequency division multiplexed, or a combination thereof.

Some examples of the method, apparatuses, and non-transitory computer-readable medium described herein may further include operations, features, means, or instructions for receiving signaling including an indication of the set of resources of the one or more physical uplink channels associated with the hop of the set of hops, where determining the set of resources of the one or more physical uplink channels associated with the hop of the set of hops may be based on the indication, the set of resources including a set of symbols or a set of slots.

Some examples of the method, apparatuses, and non-transitory computer-readable medium described herein may further include operations, features, means, or instructions for determining a second set of DMRS symbols associated with a second hop of the set of hops in the time domain or the frequency domain, and coherently transmitting, based on the determining, the second set of DMRS symbols associated with the second hop of the set of hops.

Some examples of the method, apparatuses, and non-transitory computer-readable medium described herein may further include operations, features, means, or instructions for receiving signaling including an indication of the second set of DMRS symbols associated with the second hop of the set of hops, where determining the second set of DMRS symbols may be based on the indication.

Some examples of the method, apparatuses, and non-transitory computer-readable medium described herein may further include operations, features, means, or instructions for determining a set of resources of one or more physical uplink channels associated with the second hop of the set of hops in the time domain or the frequency domain.

Some examples of the method, apparatuses, and non-transitory computer-readable medium described herein may further include operations, features, means, or instructions for receiving signaling including an indication of the set of resources of the one or more physical uplink channels associated with the second hop of the set of hops, where determining the set of resources of the one or more physical uplink channels associated with the second hop of the set of hops may be based on the indication, the set of resources including a set of symbols or a set of slots.

In some examples of the method, apparatuses, and non-transitory computer-readable medium described herein, a quantity of resources of a set of resources of the one or more physical uplink channels associated with the hop of the set of hops and a quantity of resources of the set of resources of the one or more physical uplink channels associated with the second hop of the set of hops may be different or the same.

In some examples of the method, apparatuses, and non-transitory computer-readable medium described herein, a quantity of DMRS s of the set of DMRS s associated with the hop of the set of hops and a quantity of DMRS s of the second set of DMRS s associated with the second hop of the set of hops may be different or the same.

Some examples of the method, apparatuses, and non-transitory computer-readable medium described herein may further include operations, features, means, or instructions for determining a transmit power for one or more physical uplink channels associated with the hop of the set of hops, and transmitting the one more physical uplink channels associated with the hop of the set of hops according to the transmit power, where the transmit power may be constant over the hop of the set of hops.

Some examples of the method, apparatuses, and non-transitory computer-readable medium described herein may further include operations, features, means, or instructions for determining a second transmit power for one or more physical uplink channels associated with a second hop of the set of hops, and transmitting the one more physical uplink channels associated with the second hop of the set of hops according to the second transmit power, where the second transmit power may be constant over the second hop of the set of hops.

In some examples of the method, apparatuses, and non-transitory computer-readable medium described herein, the transmit power may be different from the second transmit power.

Some examples of the method, apparatuses, and non-transitory computer-readable medium described herein may further include operations, features, means, or instructions for receiving signaling including an indication of a difference between the transmit power and the second transmit power.

In some examples of the method, apparatuses, and non-transitory computer-readable medium described herein, the signaling includes RRC signaling.

In some examples of the method, apparatuses, and non-transitory computer-readable medium described herein, the signaling includes system information signaling.

Some examples of the method, apparatuses, and non-transitory computer-readable medium described herein may further include operations, features, means, or instructions for determining a difference between the transmit power and the second transmit power based on a parameter.

Some examples of the method, apparatuses, and non-transitory computer-readable medium described herein may further include operations, features, means, or instructions for performing, based on an absence of a frequency hopping associated with the set of hops, a power ramping operation according to the difference between the transmit power and the second transmit power.

A method of wireless communication at a base station is described. The method may include determining a first set of DMRS symbols associated with a first hop of a set of hops in a time domain or a frequency domain, determining a second set of DMRS symbols associated with a second hop of the set of hops in the time domain or the frequency domain, and transmitting signaling including an indication of one or more of the first set of DMRS symbols associated with a first hop or the second set of DMRS symbols associated with the second hop.

An apparatus for wireless communication is described. The apparatus may include a processor, memory coupled with the processor, and instructions stored in the memory. The instructions may be executable by the processor to cause the apparatus to determine a first set of DMRS symbols associated with a first hop of a set of hops in a time domain or a frequency domain, determine a second set of DMRS symbols associated with a second hop of the set of hops in the time domain or the frequency domain, and transmit signaling including an indication of one or more of the first set of DMRS symbols associated with a first hop or the second set of DMRS symbols associated with the second hop.

Another apparatus for wireless communication is described. The apparatus may include means for determining a first set of DMRS symbols associated with a first hop of a set of hops in a time domain or a frequency domain, determining a second set of DMRS symbols associated with a second hop of the set of hops in the time domain or the frequency domain, and transmitting signaling including an indication of one or more of the first set of DMRS symbols associated with a first hop or the second set of DMRS symbols associated with the second hop.

A non-transitory computer-readable medium storing code for wireless communication at a base station is described. The code may include instructions executable by a processor to determine a first set of DMRS symbols associated with a first hop of a set of hops in a time domain or a frequency domain, determine a second set of DMRS symbols associated with a second hop of the set of hops in the time domain or the frequency domain, and transmit signaling including an indication of one or more of the first set of DMRS symbols associated with a first hop or the second set of DMRS symbols associated with the second hop.

Some examples of the method, apparatuses, and non-transitory computer-readable medium described herein may further include operations, features, means, or instructions for determining a first set of resources of one or more physical uplink channels associated with the first hop of the set of hops, determining a second set of resources of one or more physical uplink channels associated with the second hop of the set of hops, and transmitting a second signaling including a second indication of one or more of the first set of resources of the one or more physical uplink channels associated with the first hop or the second set of resources of the one or more physical uplink channels associated with the second hop.

In some examples of the method, apparatuses, and non-transitory computer-readable medium described herein, a quantity of resources of the first set of resources of the one or more physical uplink channels associated with the first hop and a quantity of resources of the second set of resources of the one or more physical uplink channels associated with the second hop may be different.

In some examples of the method, apparatuses, and non-transitory computer-readable medium described herein, a quantity of DMRS symbols of the first set of DMRS symbols associated with the first hop and a quantity of DMRS symbols of the second set of DMRS symbols associated with the second hop may be different.

Some examples of the method, apparatuses, and non-transitory computer-readable medium described herein may further include operations, features, means, or instructions for transmitting signaling including an indication of a difference between a first transmit power associated with the first hop and a second transmit power associated with the second hop.

In some examples of the method, apparatuses, and non-transitory computer-readable medium described herein, the signaling includes RRC signaling.

In some examples of the method, apparatuses, and non-transitory computer-readable medium described herein, the signaling includes system information signaling.

BRIEF DESCRIPTION OF THE DRAWINGS

FIGS. 5 through 8 illustrate examples of block diagrams that support PUSCH repetition with DMRS bundling in accordance with aspects of the present disclosure.

DETAILED DESCRIPTION

Figure 1:
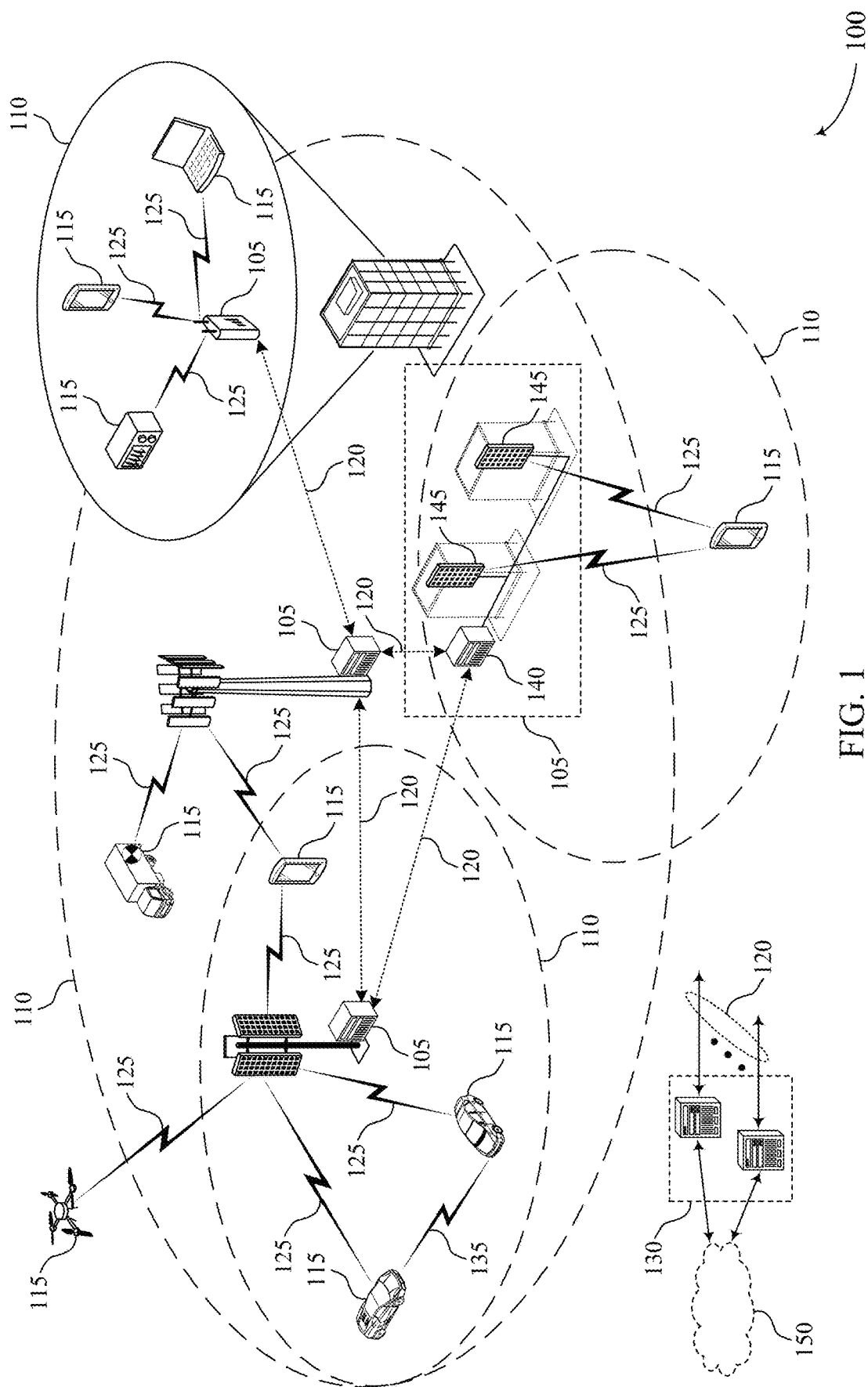
FIGS. 1 and 2 illustrate examples of wireless communications systems that support PUSCH repetition with DMRS bundling in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies (RATs) including fourth generation (4G) systems, such as Long Term Evolution (LTE) systems, as well as fifth generation (5G) systems, which may be referred to as New Radio (NR) systems. The described techniques may be used to configure the UEs with a CSI reporting configuration (e.g., a PUSCH repetition configuration, a PUSCH (re)transmission configuration), such that the UEs may extend PUSCH and PUCCH coverage for aperiodic CSI reports. For example, the UEs may provide aperiodic CSI reports to a base station (e.g., a gNB) according to one or more of the PUSCH repetition configuration or the PUSCH (re)transmission configuration. The configuration (e.g., aperiodic CSI PUSCH repetition configuration) may include a number of repetitions and a starting of the symbol in each slot. The starting symbol can be in the same location in each slot (e.g., PUSCH repetition type A) or it may be in a different location in different slot (e.g., PUSCH repetition type A). In some examples, the described techniques may facilitate configuring the UEs to provide aperiodic CSI reports exclusively on a PUSCH without a transport channel, such as an uplink shared channel (UL-SCH), for example, based on the CSI reporting configuration (e.g., a PUSCH repetition configuration, a PUSCH (re)transmission configuration).

The described techniques may be used to also configure the UEs to support physical uplink channel (e.g., PUSCH, PUCCH) DMRS bundling operations for physical uplink channel repetition or (re)transmission (e.g., PUSCH repetition, PUSCH (re)transmission, PUCCH repetition, PUCCH (re)transmission), or both. For example, the described techniques may be used to configure the UEs to support PUSCH DMRS bundling operations for one or more hops of a time domain hopping pattern or a frequency domain hopping pattern related to a PUSCH repetition or a PUSCH (re)transmission. In some examples, the described techniques may facilitate configuring the UEs to support PUSCH DMRS bundling operations by providing signaling including an indication of a number of symbols, minislots, or slots, or any combination thereof of a PUSCH for each hop or a number of PUSCH DMRS symbols to be bundled in each hop. As such, the PUSCH DMRS can be coherently provided to the UEs, which may be configured to determine channel estimation from the bundled PUSCH DMRS to enhance channel estimation for PUSCH repetition or PUSCH (re)transmission, or both. The UEs may thus be configured to support improvements to CSI operations and DMRS bundling operations in 5G systems. The described techniques may include features for improvements to power consumption and, in some examples, may promote enhanced efficiency for high reliability and low latency operations in 5G systems, among other benefits.

Aspects of the disclosure are initially described in the context of wireless communications systems. Aspects of the disclosure are further illustrated by and described with reference to process flows and CSI reporting configurations that relate to PUSCH repetition with DMRS bundling. Aspects of the disclosure are further illustrated by and described with reference to apparatus diagrams, system diagrams, and flowcharts that relate to PUSCH repetition with DMRS bundling.

FIG. 1 illustrates an example of a wireless communications system 100 that supports PUSCH repetition with DMRS bundling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A UE 115 may receive signaling including a CSI reporting configuration. The UE 115 may determine one or more resources of a physical uplink channel for aperiodic CSI reporting based on the CSI reporting configuration and transmit an aperiodic CSI report over the physical uplink channel based on the on the one or more resources. In some examples, the UE 115 may also determine a set of DMRS symbols associated with a hop of a set of hops in a time domain or a frequency domain, and bundle, based on the determining, the set of DMRS symbols associated with the hop of the set of hops.

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support (re)transmission s at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support (re)transmission s of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and (re)transmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
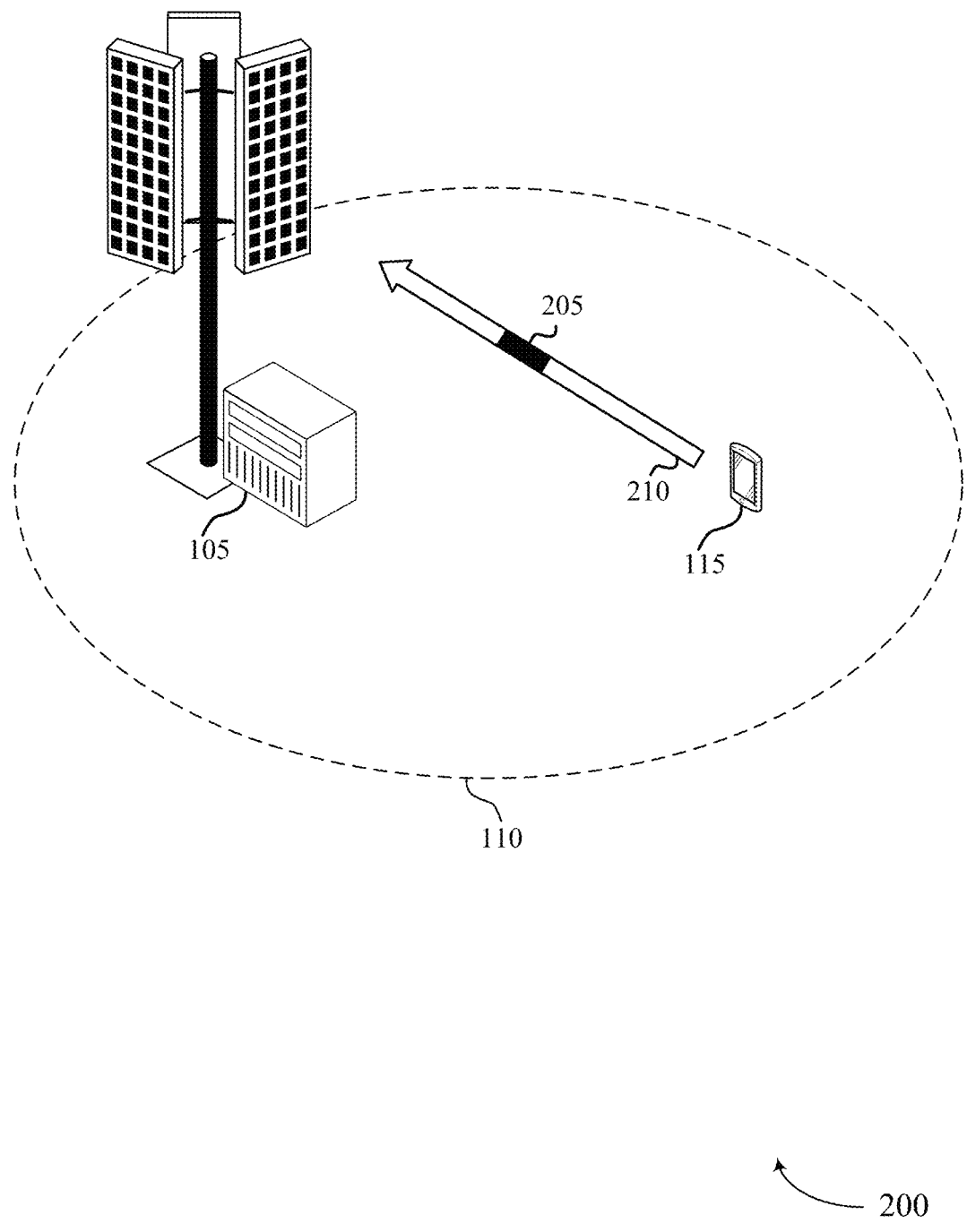

FIG. 2 illustrates an example of a wireless communications system 200 that supports PUSCH repetition with DMRS bundling in accordance with aspects of the present disclosure. In some examples, the wireless communications system 200 may implement aspects of the wireless communications system 100. For example, the wireless communications system 200 may include a base station 105 and a UE 115 within a geographic coverage area 110. The base station 105 and the UE 115 may be examples of the corresponding devices described with reference to FIG. 1. In some examples, the wireless communications system 200 may support multiple RATs including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency CSI operations, as well as DMRS bundling operations, among other benefits.

The base station 105 and the UE 115 may be configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming of communications with the UE 115. Likewise, the UE 115 may have one or more antenna arrays that may support various multiple-input multiple-output or beamforming operations. Additionally or alternatively, an antenna panel may support radio frequency beamforming for a signal transmitted via one or more antenna ports. The base station 105 and the UE 115 may thus be configured to support directional communications using the multiple antennas.

The UE 115, in the wireless communications system 200, may support CSI operations to preserve resources (for example, time and frequency resources of the wireless communications system 200), a battery life of the UE 115, among other examples. In some examples, the UE 115 may be configured to support CSI operations to manage or improve directional communications between the base station 105 and the UE 115. The CSI operations may include providing a CSI report 205 to the base station 105. The CSI report 205 may include one or more CSI parameters. In some examples, the UE 115 may generate the CSI report 205 including the one more CSI parameters based on measuring one or more reference signals, such as a synchronization signal physical broadcast channel (SS/PBCH) block (SSB) or a CSI reference signal (CSI-RS) from the base station 105. For example, the base station 105 may transmit, and the UE 115 may receive, one or more SSBs or CSI-RS via directional communications 210 between the base station 105 and the UE 115.

The one or more CSI parameters may include one or more of a channel quality indicator (CQI), a precoding matrix indicator (PMI), or a CSI reference signal (CSI-RS) indicator (CRI). In some other examples, the one or more CSI parameters may additionally or alternatively include one or more of a synchronization signal physical broadcast channel (SS/PBCH) block resource indicator (SSBRI), a layer indicator (LI), a rank indicator (RI), or a layer one reference signal received power (L1-RSRP). In some examples, the UE 115 may determine the LI based in part on the CQI, the PMI, the RI, or the CRI, or any combination thereof. The UE 115 may, in some examples, determine the CQI based in part on the PMI, the RI, or the CRI, or any combination thereof. In some examples, the UE 115 may determine the PMI based in part on the RI or the CRI, or both. The UE 115 may determine the RI based in part on the CRI.

The UE 115 may transmit the CSI report 205 via directional communications 210. The directional communications 210 may include providing the CSI report 205 on one or more physical channels, such as a PUSCH, a physical uplink control channel (PUCCH), or the like. In some examples, the base station 105 may configure the UE 115 with a CSI reporting configuration. In some examples, the CSI report 205 may be an aperiodic CSI report, and the UE 115 may transmit the aperiodic CSI report on a PUSCH according to the CSI reporting configuration. In some examples, the CSI report 205 may be a periodic CSI report, and the UE 115 may transmit the periodic CSI report using a PUCCH according to the CSI reporting configuration. Alternatively, the CSI report 205 may be a semi-persistent CSI report, and the UE 115 may transmit the semi-persistent CSI report using PUCCH or a downlink control information (DCI) activated PUSCH, according to the CSI reporting configuration. An example of aperiodic CSI reporting is described with reference to FIG. 3, and an example of periodic CSI reporting is described with reference to FIG. 4.

Figure 3:
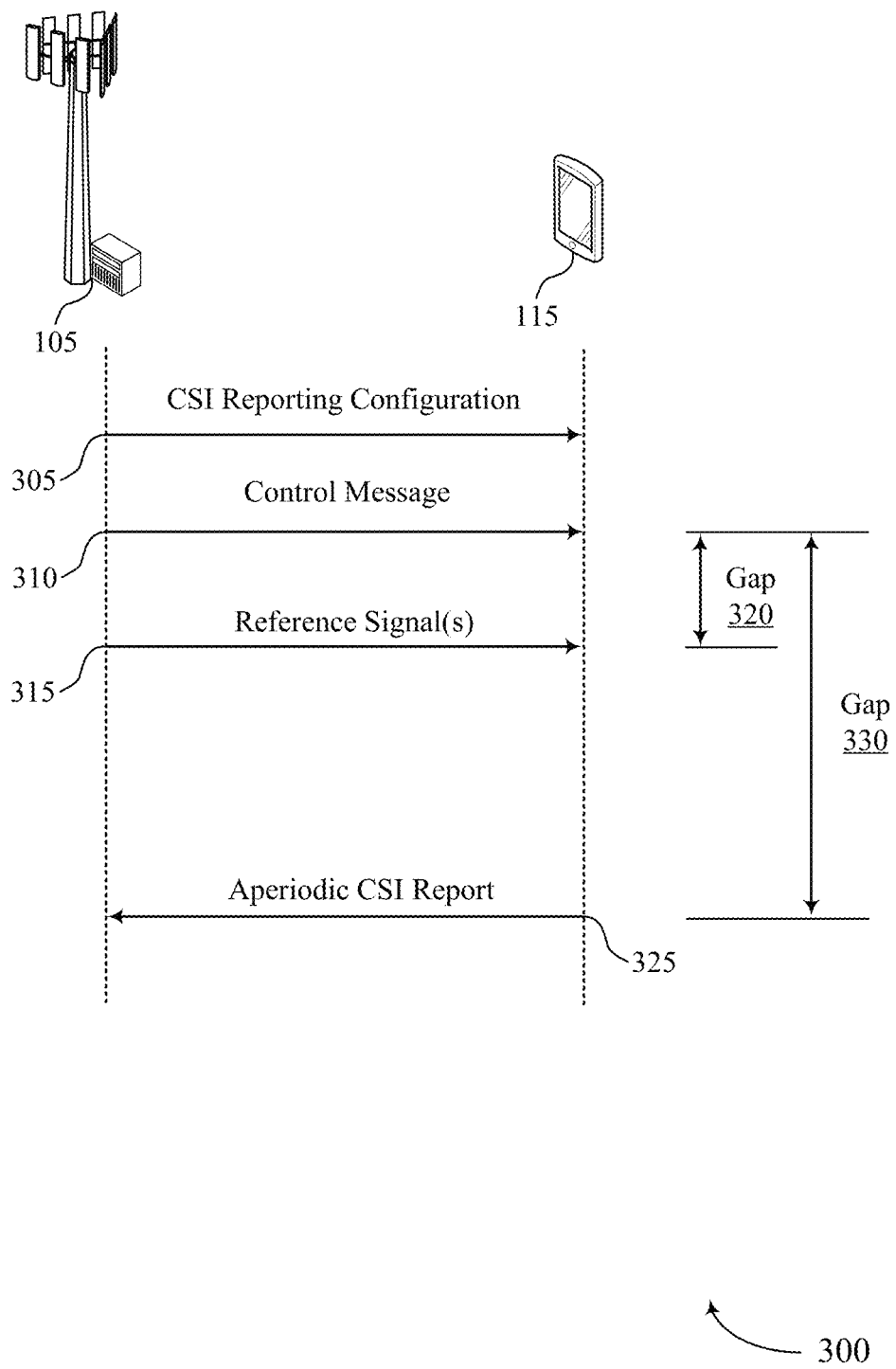
FIG. 3 illustrates an example of a process flow that supports aperiodic CSI reporting in accordance with aspects of the present disclosure.

FIG. 3 illustrates an example of a process flow 300 that supports aperiodic CSI reporting in accordance with aspects of the present disclosure. The process flow 300 may implement aspects of the wireless communications system 100 and 200 described with reference to FIGS. 1 and 2, respectively. For example, the process flow 300 may be based on a configuration by a base station 105 or a UE 115, and implemented by the UE 115. The base station 105 and the UE 115 may be examples of a base station and a UE, as described with reference to FIGS. 1 and 2. In the following description of the process flow 300, the operations between the base station 105 and the UE 115 may be transmitted in a different order than the example order shown, or the operations performed by the base station 105 and the UE 115 may be performed in different orders or at different times. Some operations may also be omitted from the process flow 300, and other operations may be added to the process flow 300.

At 305, the base station 105 may transmit a CSI reporting configuration to the UE 115. For example, the base station 105 may transmit the CSI reporting configuration via directional communications. The directional communications may include a random access channel (RACH), a physical downlink control channel (PDCCH), a physical downlink shared channel (PDSCH), or the like. In some examples, the base station 105 may transmit the CSI reporting configuration via radio resource control (RRC) signaling. As such, the CSI reporting configuration may be provided in an RRC configuration message, which may include one or more parameters (e.g., information elements) configuring the UE 115 for CSI reporting. For example, a parameter may configure the UE 115 to support aperiodic CSI reporting. In other words, the parameter may indicate a CSI report type for the UE 115. In some other examples, a parameter may indicate time or frequency resources, or both for the UE 115 to use for the aperiodic CSI reporting.

At 310, the base station 105 may transmit a control message to the UE 115. In some examples, the control message may be a downlink control information (DCI). In some other examples, the control message may be a medium access control (MAC) control element (CE) (MAC-CE). The base station 105 may include a trigger in the control message for the aperiodic CSI reporting. That is, the CSI reporting configuration may be activated or deactivated based on the trigger in the control message. As such, the UE 115 may activate or deactivate the CSI reporting configuration based on the trigger in the control message.

At 315, the base station 105 may transmit one or more reference signals to the UE 115. For example, the base station 105 may transmit one or more CSI-RS or one or more SSBs to the UE 115 via directional communications, as described in FIGS. 1 and 2. In some examples, there may be a gap 325, for example, a timing gap between 310 and 315. The gap 325 may include one more symbols, minislots, or slots. The base station 105 may thus transmit one or more reference signals to the UE 115 after one or more symbols, minislots, or slots from transmitting the control message to the UE 115. The UE 115 may determine one or more CSI parameters, as described with reference to FIG. 2 based on the one or more received reference signals. For example, the UE 115 may determine one or more of a CQI, a PMI, or a CRI. In some other examples, the UE 115 may determine additionally or alternatively one or more of an SSBRI, an LI, an RI, or a L1-RSRP.

At 325, the UE 115 may transmit an aperiodic CSI report to the base station 105. The UE 115 may transmit the aperiodic CSI report to the base station 105 via directional communications, as described in FIGS. 1 and 2. For example, the UE 115 may transmit the aperiodic CSI report on a PUSCH via directional communications. In some examples, there may be a gap 330, for example, a timing gap between 310 and 325. The gap 330 may include one more symbols, minislots, or slots. The UE 115 may thus transmit an aperiodic CSI report on the PUSCH to the base station 105 after one or more symbols, minislots, or slots from receiving the control message from the base station 105.

Figure 4:
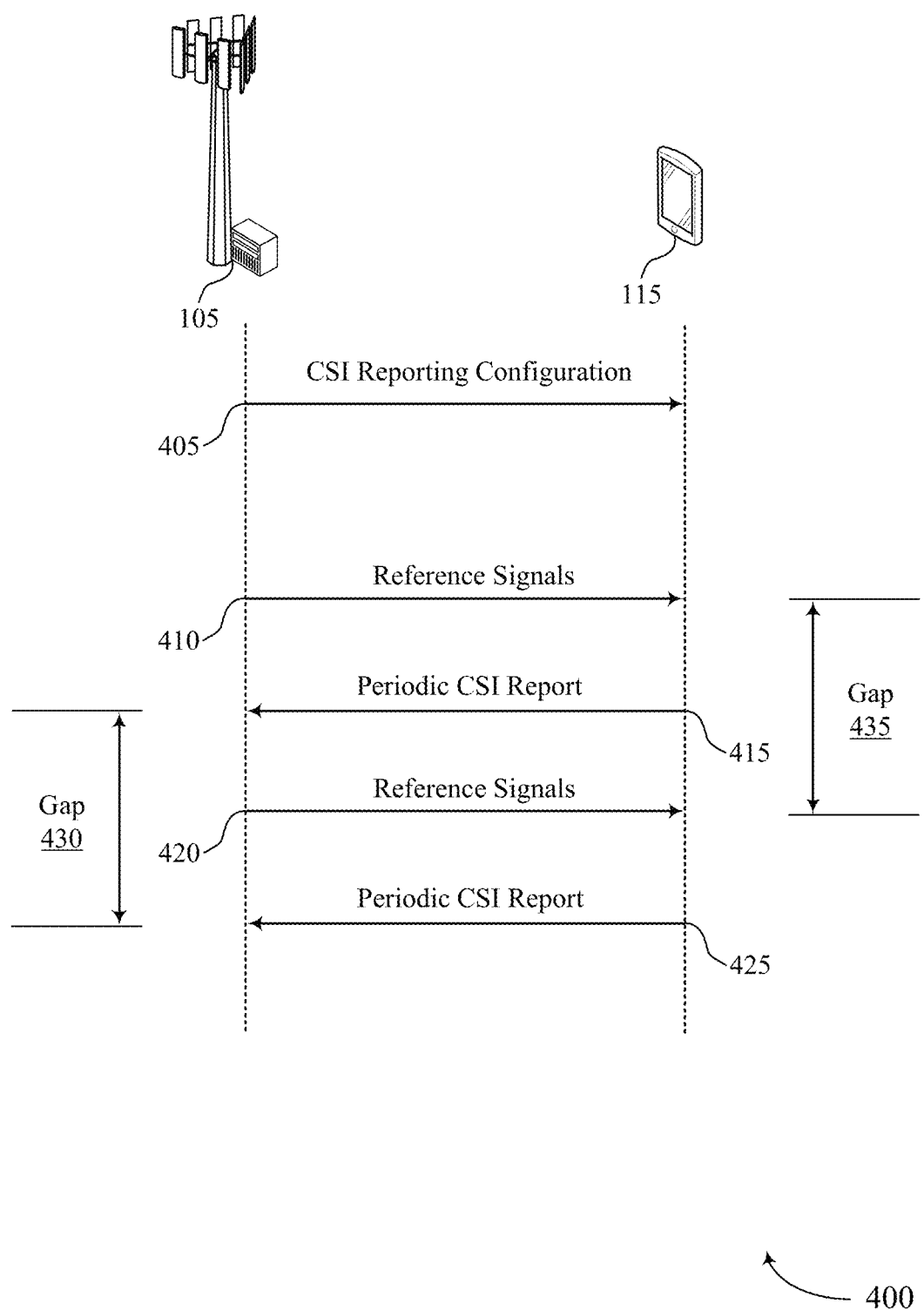
FIG. 4 illustrates an example of a process flow that supports periodic CSI reporting in accordance with aspects of the present disclosure.

FIG. 4 illustrates an example of a process flow 400 that supports periodic CSI reporting in accordance with aspects of the present disclosure. The process flow 400 may implement aspects of the wireless communications system 100 and 200 described with reference to FIGS. 1 and 2, respectively. For example, the process flow 400 may be based on a configuration by a base station 105 or a UE 115, and implemented by the UE 115. The base station 105 and the UE 115 may be examples of a base station and a UE, as described with reference to FIGS. 1 and 2. In the following description of the process flow 400, the operations between the base station 105 and the UE 115 may be transmitted in a different order than the example order shown, or the operations performed by the base station 105 and the UE 115 may be performed in different orders or at different times. Some operations may also be omitted from the process flow 400, and other operations may be added to the process flow 400.

At 405, the base station 105 may transmit a CSI reporting configuration to the UE 115. For example, the base station 105 may transmit the CSI reporting configuration via directional communications. The directional communications may include a RACH, a PDCCH, a PDSCH, or the like. In some examples, the base station 105 may transmit the CSI reporting configuration via RRC signaling. As such, the CSI reporting configuration may be provided in an RRC configuration message, which may include one or more parameters (e.g., information elements) configuring the UE 115 for CSI reporting. For example, a parameter may configure the UE 115 to support periodic CSI reporting. In other words, the parameter may indicate a CSI report type for the UE 115. In some other examples, a parameter may indicate time or frequency resources, or both for the UE 115 to use for the periodic CSI reporting.

At 410, the base station 105 may transmit one or more reference signals to the UE 115. For example, the base station 105 may transmit one or more CSI-RS or one or more SSBs to the UE 115 via directional communications, as described in FIGS. 1 and 2. The UE 115 may determine one or more CSI parameters, as described with reference to FIG. 2 based on the one or more received reference signals. For example, the UE 115 may determine one or more of a CQI, a PMI, or a CRI. In some other examples, the UE 115 may determine additionally or alternatively one or more of an SSBRI, an LI, an RI, or a L1-RSRP. At 415, the UE 115 may transmit a periodic CSI report to the base station 105. The UE 115 may transmit the periodic CSI report to the base station 105 via directional communications, as described in FIGS. 1 and 2. For example, the UE 115 may transmit the periodic CSI report on a PUCCH via directional communications.

At 420, the base station 105 may again transmit one or more reference signals to the UE 115. For example, the base station 105 may transmit one or more CSI-RS or one or more SSBs to the UE 115 via directional communications, as described in FIGS. 1 and 2. The UE 115 may determine one or more CSI parameters, as described with reference to FIG. 2 based on the one or more received reference signals. At 425, the UE 115 may again transmit a periodic CSI report to the base station 105. The UE 115 may transmit the periodic CSI report to the base station 105 via directional communications, as described in FIGS. 1 and 2. For example, the UE 115 may transmit the periodic CSI report on a PUCCH via directional communications.

In some examples, there may be a gap 430, for example, a timing gap between 410 and 420. The gap 430 may include one more symbols, minislots, or slots. In the example of FIG. 4, the timing gap may be periodic. The base station 105 may thus transmit one or more reference signals to the UE 115 based on a periodicity of one or more symbols, minislots, or slots. Similarly, in some examples, there may be a gap 435, for example a timing gap between 415 and 425. The gap 435 may include one more symbols, minislots, or slots. In the example of FIG. 4, the timing gap may be periodic. The UE 115 may thus transmit a periodic CSI report to the based station 105 based on a periodicity, such as of one or more symbols, minislots, or slots.

Returning to FIG. 2, in some examples, the CSI report 205 may be an aperiodic CSI report, and the UE 115 may transmit the aperiodic CSI report on a PUSCH according to the CSI reporting configuration. The PUSCH may exclusively carry the aperiodic CSI report (i.e., without an uplink shared channel (UL-SCH)). In some other examples, the PUSCH may alternatively carry both the aperiodic CSI report and the UL-SCH. In some cases, the wireless communications system 200 may be unable to support PUSCH repetition, as well as PUSCH (re)transmission (i.e., hybrid automatic repeat request (HARQ)) when the PUSCH carries an aperiodic CSI report. As such, the UE 115 may experience reduced coverage for the PUSCH. As demand for communication efficiency increases, the wireless communications system 200 may extend PUSCH coverage for the UE 115. To extend PUSCH coverage for the UE 115, the base station 105 may configure the UE 115 to support PUSCH repetition or PUSCH (re)transmission, or both for a PUSCH carrying an aperiodic CSI report.

For example, the base station 105 may transmit a CSI reporting configuration, which may include one or more of a PUSCH repetition configuration or a PUSCH (re)transmission configuration, or both that supports aperiodic CSI reporting. The base station 105 may transmit, and the UE 115 may receive, the CSI reporting configuration via signaling, such as RRC signaling, DCI signaling, or MAC-CE signaling. The UE 115 may determine one or more resources of a PUSCH for aperiodic CSI reporting based on the CSI reporting configuration. For example, the UE 115 may determine the one or more resources of the PUSCH for the aperiodic CSI reporting based on the PUSCH repetition configuration. In some examples, the UE 115 may determine a PUSCH repetition based on the PUSCH repetition configuration. The PUSCH repetition may include a repetition of one or more PUSCH over one or more resources.

The one or more resources may include symbols, minislots, or slots, or any combination thereof. In some examples, the repetition of the one or more PUSCH over the one or more resources may be consecutive or nonconsecutive. The UE 115 may transmit the CSI report 205 (e.g., an aperiodic CSI report) according to the PUSCH repetition. In some examples, when the repetition for PUSCH carrying the CSI report 205 (e.g., an aperiodic CSI report) is configured, the PUSCH may exclusively carry the CSI report 205 (e.g., an aperiodic CSI report) and no UL-SCH. An example of consecutive PUSCH repetition related to aperiodic CSI reporting is described with reference to FIG. 5, and an example of nonconsecutive PUSCH repetition related to periodic CSI reporting is described with reference to FIG. 6.

FIG. 5 illustrates an example of a block diagram 500 that supports PUSCH repetition with DMRS bundling in accordance with aspects of the present disclosure. The block diagram 500 may implement aspects of the wireless communications system 100 and 200 described with reference to FIGS. 1 and 2, respectively. The block diagram 500 may implement aspects of the wireless communications system 100 and 200 described with reference to FIGS. 1 and 2, respectively. The block diagram 500 may be based on a configuration by a base station 105 or a UE 115, and implemented by the UE 115. In the example illustrated in FIG. 5, the block diagram 500 is applicable to implementations or instances when the UE 115 is configured with CSI operations, such as aperiodic CSI reporting for PUSCH repetitions in 5G systems. For example, the block diagram 500 may include one or more PUSCH 505, which may correspond to time resources (for example, a symbol duration, a minislot duration, a slot duration, a subframe duration, a frame duration), as well as frequency resources (for example, subcarriers, carriers).

With reference to FIGS. 2 and 5, when repetition for PUSCH carrying an aperiodic CSI is configured, a repetition of multiple PUSCH 505 may be back-to-back in a time domain. For example, the repetition of the multiple PUSCH 505 may be consecutive over minislots. In other words, each PUSCH 505 may be associated with a separate minislot, where each of the separate minislots corresponding to different PUSCH 505 are consecutive in a time domain. In other examples, the repetition of the multiple PUSCH 505 may be consecutive over slots. As such, the repetition of the multiple PUSCH 505 may be minislot-based or slot-based. In some other examples, the repetition of the multiple PUSCH 505 may be symbol-based.

Figure 6:
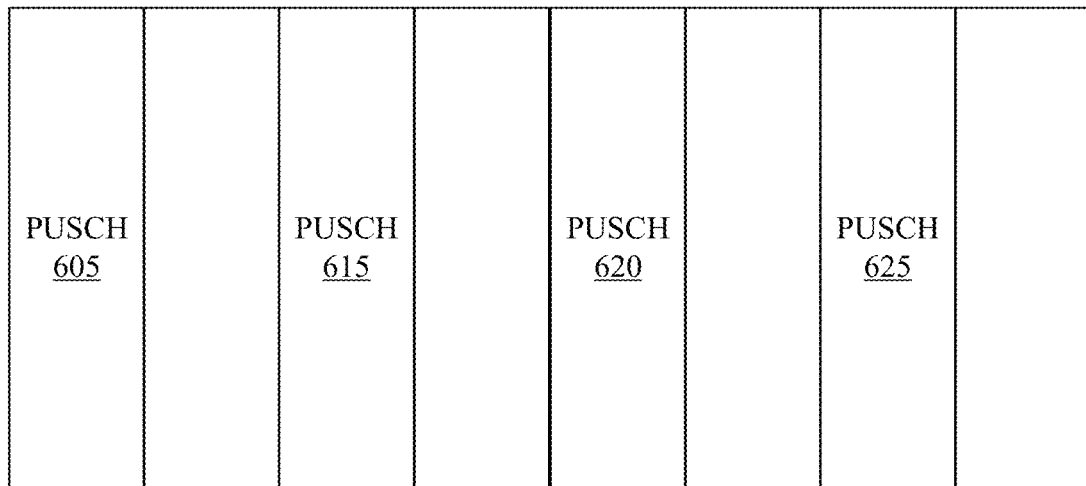

FIG. 6 illustrates an example of a block diagram 600 that supports PUSCH repetition with DMRS bundling in accordance with aspects of the present disclosure. The block diagram 600 may implement aspects of the wireless communications system 100 and 200 described with reference to FIGS. 1 and 2, respectively. The block diagram 600 may implement aspects of the wireless communications system 100 and 200 described with reference to FIGS. 1 and 2, respectively. The block diagram 600 may be based on a configuration by a base station 105 or a UE 115, and implemented by the UE 115. In the example illustrated in FIG. 6, the block diagram 600 is applicable to implementations or instances when the UE 115 is configured with CSI operations, such as aperiodic CSI reporting for PUSCH repetitions in 5G systems. For example, the block diagram 600 may include one or more PUSCH 605, which may correspond to time resources (for example, a symbol duration, a minislot duration, a slot duration, a subframe duration, a frame duration), as well as frequency resources (for example, subcarriers, carriers).

In some examples, with reference to FIGS. 2 and 6, when repetition for PUSCH carrying an aperiodic CSI report is configured, a repetition of multiple PUSCH 605 may not be back-to-back in a time domain. For example, the repetition of the multiple PUSCH 605 may be nonconsecutive over minislots. In other words, each PUSCH 605 may be associated with a separate minislot, where each of the separate minislots corresponding to different PUSCH 605 are nonconsecutive in a time domain. For example, there may be at least one minislot between each PUSCH 605. In other examples, the repetition of the multiple PUSCH 605 may be nonconsecutive over slots. As such, the repetition of the multiple PUSCH 605 may be minislot-based or slot-based. In some other examples, the repetition of the multiple PUSCH 605 may be symbol-based.

Returning to FIG. 2, in some examples, the base station 105 may configure the UE 115 separately for aperiodic CSI reporting, periodic CSI reporting, and semipersistent CSI reporting for PUSCH repetition. For example, the base station 105 may configure the UE 115 to support PUSCH repetition for aperiodic CSI reporting exclusively. In other words, the UE 115 may not be configured to support PUSCH repetition for the periodic CSI reporting and the semipersistent CSI reporting. In some examples, the base station 105 may configure the UE 115 to manage (e.g., control) aperiodic CSI reporting for PUSCH repetition based on a threshold. For example, the base station 105 may configure a coding rate threshold (e.g., a maximum coding rate) for the aperiodic CSI reporting. As such, if the UE 115 determines that the CSI report 205 (e.g., an aperiodic CSI report) satisfies the coding rate threshold, the UE 115 may support PUSCH repetition for aperiodic CSI reporting.

For example, the UE 115 may determine a payload size associated with the CSI report 205 (e.g., an aperiodic CSI report) and determine that the payload size satisfies the coding rate threshold. In some examples, the UE 115 may determine a quotient by dividing the payload size by another factor, such as resources, modulation order, etc., and determine whether the quotient satisfies the coding rate threshold. If the quotient satisfies the coding rate threshold, the UE 115 may support PUSCH repetition for aperiodic CSI reporting. Otherwise, the UE 115 may refrain from applying PUSCH repetition for aperiodic CSI reporting.

In some examples, the base station 105 may configure the UE 115 to manage (e.g., control) aperiodic CSI reporting for PUSCH repetition based on a semi-static configuration (e.g., an RRC configuration message). For example, the base station 105 may transmit, and the UE 115 may receive, a bit indication in an RRC configuration message. The UE 115 may determine a quantity of component carriers to use for transmitting the CSI report (e.g., aperiodic CSI report) and a repetition factor associated with the CSI reporting. In some examples, the bit indication may be a multibit indication to support an indication of various component carriers when the UE 115 is configured with uplink carrier aggregation. An example of selecting a PUSCH to transmit an aperiodic CSI report is described with reference to FIGS. 7 and 8.

Figure 7:
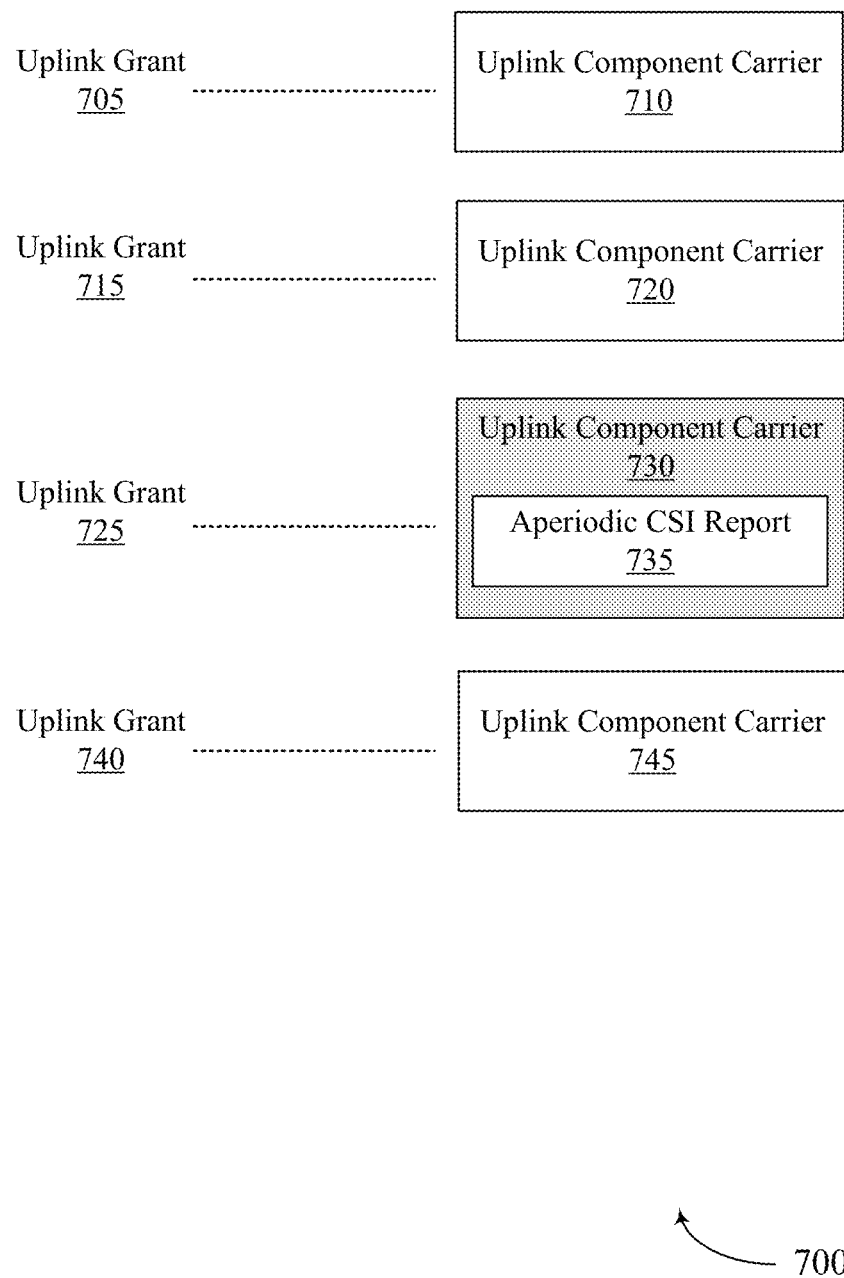

FIG. 7 illustrates an example of a block diagram 700 that supports PUSCH repetition with DMRS bundling in accordance with aspects of the present disclosure. The block diagram 700 may implement aspects of the wireless communications system 100 and 200 described with reference to FIGS. 1 and 2, respectively. The block diagram 700 may implement aspects of the wireless communications system 100 and 200 described with reference to FIGS. 1 and 2, respectively. The block diagram 700 may be based on a configuration by a base station 105 or a UE 115, and implemented by the UE 115. In the example illustrated in FIG. 7, the block diagram 700 is applicable to implementations or instances when the UE 115 is configured with CSI operations, such as aperiodic CSI reporting for PUSCH repetitions in 5G systems, as well as configured with uplink carrier aggregation. For example, the UE 115 may be configured with multiple uplink component carriers according to a carrier aggregation configuration. The carrier aggregation may be used with both frequency division duplexing (FDD) and time division duplexing (TDD) component carriers. In the example illustrated in FIG. 7, the block diagram 700 may include one or more uplink component carriers, such as uplink component carriers 710 through 745.

In some cases, the base station 105 may transmit, and the UE 115 may receive, an uplink grant via DCI, which may include an indication of a component carrier and corresponding time and frequency resources for PUSCH carrying an aperiodic CSI report. In some examples, the base station 105 may transmit, and the UE 115 may receive, an uplink grant 705 via DCI, which may include an indication of an uplink component carrier 710. In some examples, the base station 105 may transmit, and the UE 115 may receive, an uplink grant 715 via DCI, which may include an indication of a component carrier 720. In some examples, the base station 105 may transmit, and the UE 115 may receive, an uplink grant 725 via DCI, which may include an indication of a component carrier 730 and corresponding resources for PUSCH carrying an aperiodic CSI report 735. Here, the DCI may include the additional indication of the corresponding resources for the PUSCH carrying the aperiodic CSI report 735. In some examples, the base station 105 may transmit, and the UE 115 may receive, an uplink grant 740 via DCI, which may include an indication of a component carrier 745. One or more of the uplink component carrier 710, 720, or 745 may be used for other reporting, such as periodic CSI reporting. In some examples, for periodic CSI reporting or semi-persistence CSI reporting, the UE 115 may select a component carrier for PUCCH or PUSCH, or both based on a component carrier index (e.g., a lowest component carrier index).

Figure 8:
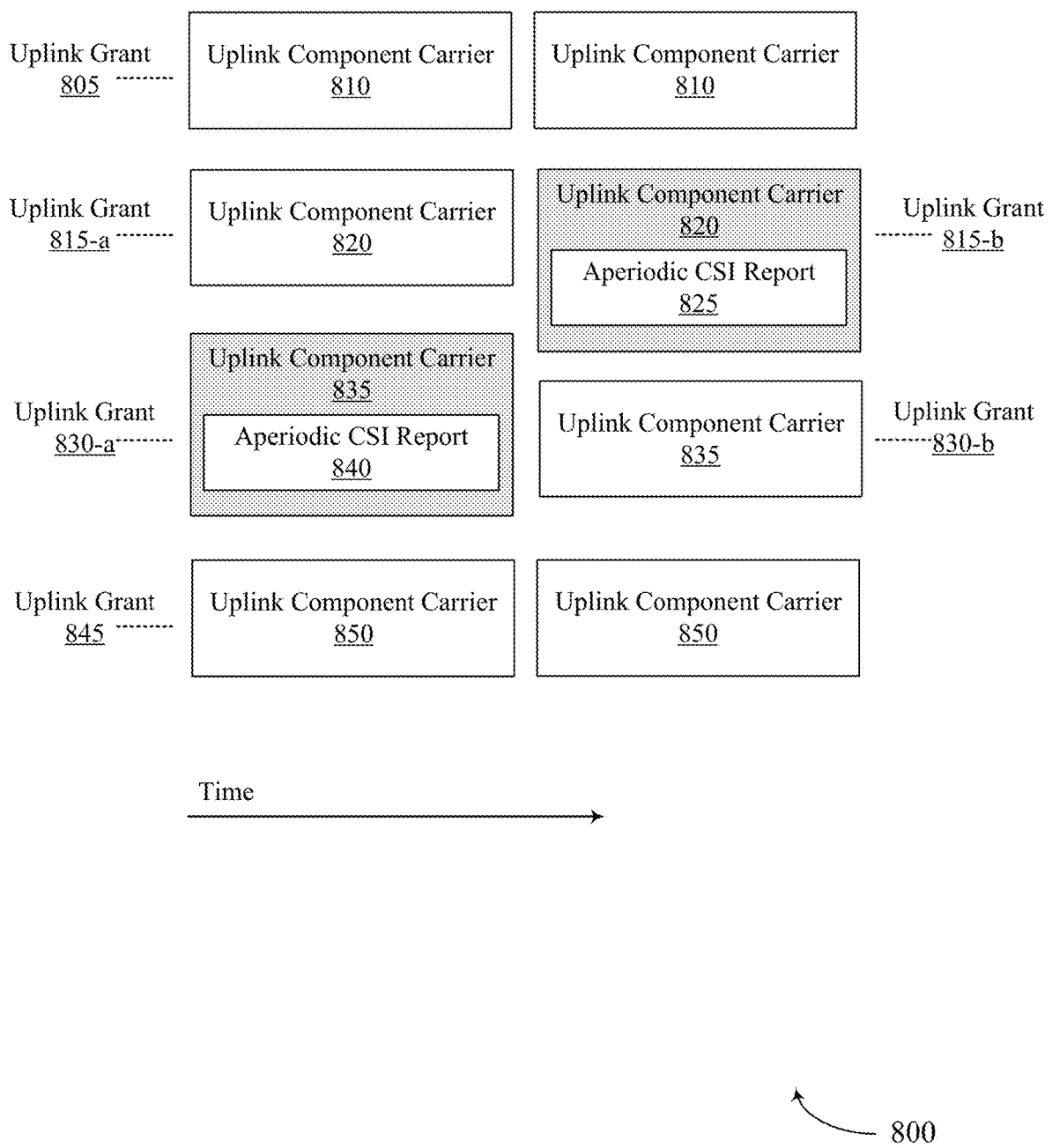

FIG. 8 illustrates an example of a block diagram 800 that supports PUSCH repetition with DMRS bundling in accordance with aspects of the present disclosure. The block diagram 800 may implement aspects of the wireless communications system 100 and 200 described with reference to FIGS. 1 and 2, respectively. The block diagram 800 may implement aspects of the wireless communications system 100 and 200 described with reference to FIGS. 1 and 2, respectively. The block diagram 800 may be based on a configuration by a base station 105 or a UE 115, and implemented by the UE 115. In the example illustrated in FIG. 8, the block diagram 800 is applicable to implementations or instances when the UE 115 is configured with CSI operations, such as aperiodic CSI reporting for PUSCH repetitions in 5G systems, as well as configured with uplink carrier aggregation. For example, the UE 115 may be configured with multiple uplink component carriers according to a carrier aggregation configuration. The carrier aggregation may be used with both FDD and TDD component carriers.

In the example illustrated in FIG. 8, the block diagram 800 may include one or more uplink component carriers, such as uplink component carriers 810 through 850. In some cases, the base station 105 may transmit, and the UE 115 may receive, an uplink grant via DCI, which may include an indication of a component carrier and corresponding time and frequency resources for PUSCH carrying an aperiodic CSI report. In some examples, the base station 105 may transmit, and the UE 115 may receive, an uplink grant 805 via DCI, which may include an indication of an uplink component carrier 810. In some examples, the base station 105 may transmit, and the UE 115 may receive, an uplink grant 815-*a* via DCI, which may include an indication of a component carrier 820. In some examples, the base station 105 may transmit, and the UE 115 may receive, an uplink grant 830-*a* via DCI, which may include an indication of a component carrier 730 and corresponding resources for PUSCH carrying an aperiodic CSI report 840. Here, the DCI may include the additional indication of the corresponding resources for the PUSCH carrying the aperiodic CSI report 840. In some examples, the base station 105 may transmit, and the UE 115 may receive, an uplink grant 845 via DCI, which may include an indication of a component carrier 850.

In some examples, with reference to FIGS. 2 and 8, when repetition for PUSCH carrying an aperiodic CSI report is configured, the UE 115 may support all PUSCH repetition carrying the aperiodic CSI report on a same indicated component carrier. In some other examples, when repetition for PUSCH carrying an aperiodic CSI report is configured, the UE 115 may support PUSCH repetition carrying the aperiodic CSI report on different component carriers. The base station 105 may transmit, and the UE 115 may receive, an uplink grant 815-*b* via DCI, which may include an indication of a component carrier 820 and corresponding resources for PUSCH carrying an aperiodic CSI report 825. Here, the DCI may include the additional indication of the corresponding resources for the PUSCH carrying the aperiodic CSI report 825. In some examples, the base station 105 may transmit, and the UE 115 may receive, an uplink grant 830-*b* via DCI, which may include an indication of a component carrier 820. As such, in some examples, some PUSCH repetition may be on a first component carrier over consecutive slots while a remainder of the PUSCH repetition may be on a second component carrier different from the first component carrier. Alternatively, the PUSCH repetition may transmitted over different component carriers over each consecutive slot.

Returning to FIG. 2, in some examples, the UE 115 may be configured to support (re)transmission for PUSCH carrying the CSI report 205 (e.g., aperiodic CSI report). For example, the UE 115 may be configured to use a component carrier both for transmitting an aperiodic CSI report on a PUSCH based on an DCI indication (e.g., triggering an aperiodic CSI report), as well as for retransmitting the aperiodic CSI report on the PUSCH. In other examples, the UE 115 may be configured to use a component carrier for transmitting an aperiodic CSI report on a PUSCH based on an DCI indication (e.g., triggering an aperiodic CSI report), and another component carrier for retransmitting the aperiodic CSI report on the PUSCH. The selection of a component carrier for transmitting an aperiodic CSI report via PUSCH may be per minislot or slot, or transmission basis.

In some examples, a PUSCH repetition level (e.g., a number of PUSCH repetitions) may be based on a quality of downlink reference signals. The quality may be a reference signal received power (RSRP) or a reference signal received quality (RSRQ). Downlink reference signals may include, but is not limited to, CSI-RS or synchronization signal physical broadcast channel (SS/PBCH). As such, the UE 115 may determine one or more of an RSRP or an RSRQ of a CSI-RS or an SS/PBCH, and determine a PUSCH repetition level based on one or more of the RSRP or the RSRQ of the CSI-RS or the SS/PBCH. If one or more of the RSRP or the RSRQ of the CSI-RS or the SS/PBCH satisfies a threshold (e.g., is greater than a predefined threshold), the UE 115 may not support PUSCH repetitions. Otherwise, the UE 115 may support PUSCH repetitions. In some examples, the PUSCH repetition level may be per minislot or slot, or transmission basis.

In some examples, the base station 105 may configure the UE 115 to support PUSCH DMRS bundling operations for PUSCH repetition or PUSCH (re)transmission, or both. For example, the UE 115 may be configured to support PUSCH DMRS bundling operations for each hop of a time domain hopping pattern or a frequency domain hopping pattern related to a PUSCH repetition or a PUSCH (re)transmission. As a result, the UE 115 may bundle PUSCH DMRs of a PUSCH that belong to a same hop. As described the term bundling (also referred to as coherently transmitting) may be defined as coherent transmission of PUSCH over multiple PUSCH transmissions. In order to have such coherent transmission, the phase continuity has to be maintained over the multiple PUSCH transmission. An example of PUSCH DMRS bundling operations related PUSCH repetition or PUSCH (re)transmission, or both is described with reference to FIGS. 9 and 10.

Figure 9:
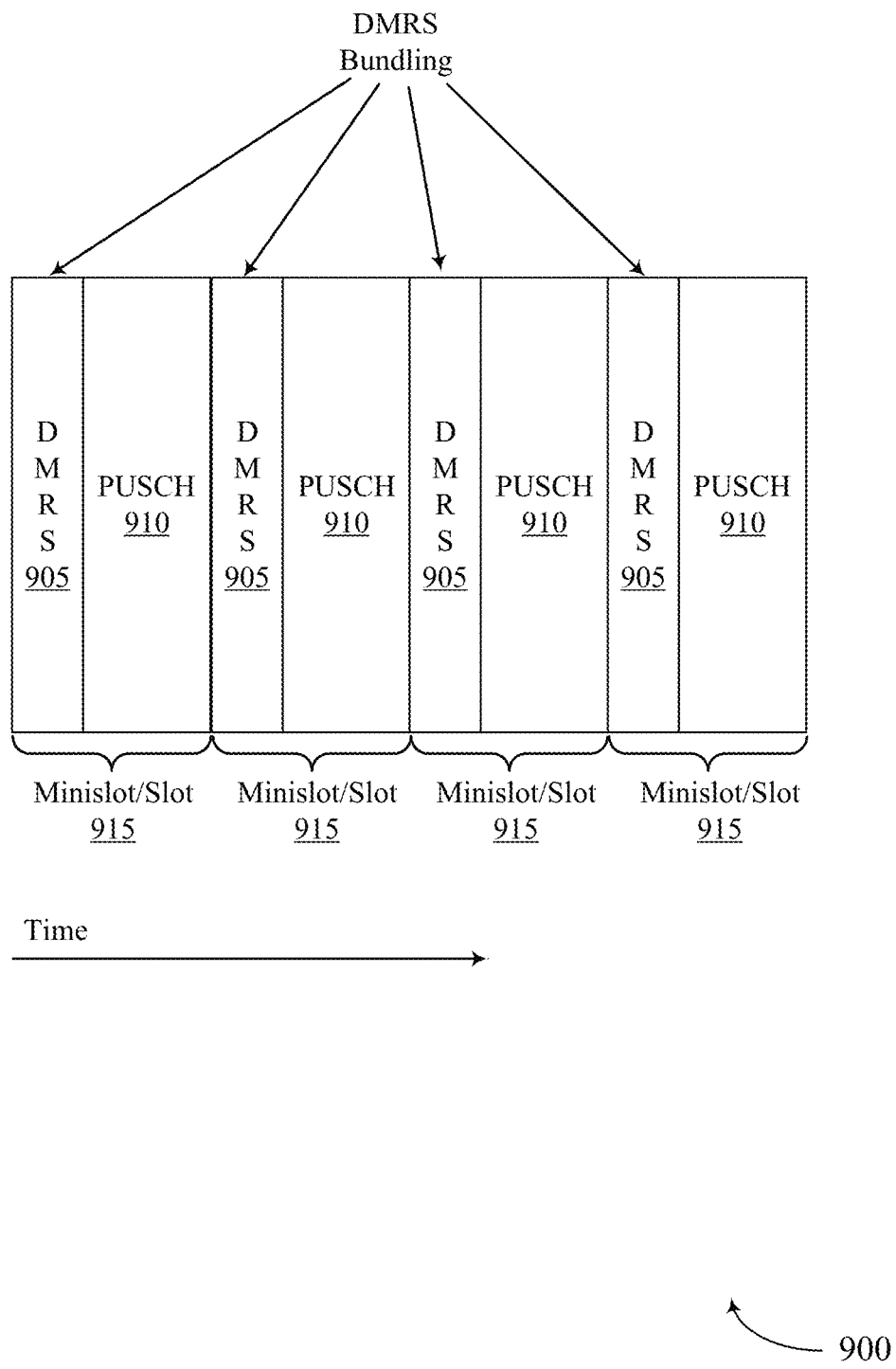
FIGS. 9 through 11 illustrate examples of block diagrams that support PUSCH DMRS bundling operations related to PUSCH repetition with DMRS bundling in accordance with aspects of the present disclosure.

FIG. 9 illustrates an example of a block diagram 900 that supports PUSCH repetition with DMRS bundling in accordance with aspects of the present disclosure. The block diagram 900 may implement aspects of the wireless communications system 100 and 200 described with reference to FIGS. 1 and 2, respectively. The block diagram 900 may implement aspects of the wireless communications system 100 and 200 described with reference to FIGS. 1 and 2, respectively. The block diagram 900 may be based on a configuration by a base station 105 or a UE 115, and implemented by the UE 115. In the example illustrated in FIG. 9, the block diagram 900 is applicable to implementations or instances when the UE 115 is configured with PUSCH DMRS bundling operations to support PUSCH repetition or PUSCH (re)transmission, or both. For example, the block diagram 900 may include one or more DMRS 905 and one or more PUSCH 910, which may correspond to time resources (for example, a symbol duration, a minislot duration, a slot duration, a subframe duration, a frame duration), as well as frequency resources (for example, subcarriers, carriers). For example, a DMRS 905 and a PUSCH 910 may span a minislot duration or a slot duration (e.g., a minislots/slot 915). In the example of FIG. 9, the one or more PUSCH 910 may be illustrative of a PUSCH repetition.

With reference to FIG. 2, the base station 105 may configure the UE 115 to support PUSCH DMRS coherent transmission over a time domain. For example, the UE 115 may bundle one more DMRS 905 over a time domain (e.g., over the minislots/slots 915). By coherently transmitting the one or more DMRS 905 over the time domain, the base station 105 may transmit the DMRS 905 over with a carrier phase continuity and a same phase continuity of a precoding matrix or at least a same phase continuity of a precoding matrix. As such, the DMRS 905 can be coherently transmitted over different time instants. In some examples, PUSCH phase continuity may issue from noncontiguous time resource allocation. The noncontiguous time resource allocation may relate to a timing gap, which for PUSCH symbols may be greater than or equal to a threshold. Other uplink channels (e.g., PUCCH), signals (e.g., sounding reference signals (SRS), etc.) or downlink channels or signals (e.g., PDCCH, PDSCH, SSB, CSI-RS, etc.) may be transmitted during the timing gap. In some other examples, PUSCH phase continuity may issue from different frequency resource allocation for PUSCH symbols. In other examples, PUSCH phase continuity may be due to a transmit power or a transmit waveform.

The UE 115 may determine channel estimate from the DMRS 905 in different time instants by coherently combining the channel estimate to improve channel estimation. In some examples, the UE 115 may support PUSCH DMRS bundling for PUSCH repetition over multiple minislots or slots. In some other examples, the UE 115 may support PUSCH DMRS bundling for PUSCH carrying different transport blocks (TBs). In some examples, the UE 115 may be configured to use time hopping in a time domain or a frequency hopping in a frequency domain to achieve diversity gain for PUSCH. In some examples, PUSCH DMRS bundling may be supported for each hop (i.e., DMRS of PUSCH in a same hop may be bundled). An example of frequency hopping is described with reference to FIG. 10, and an example without frequency hopping is described with reference to FIG. 11.

Figure 10:
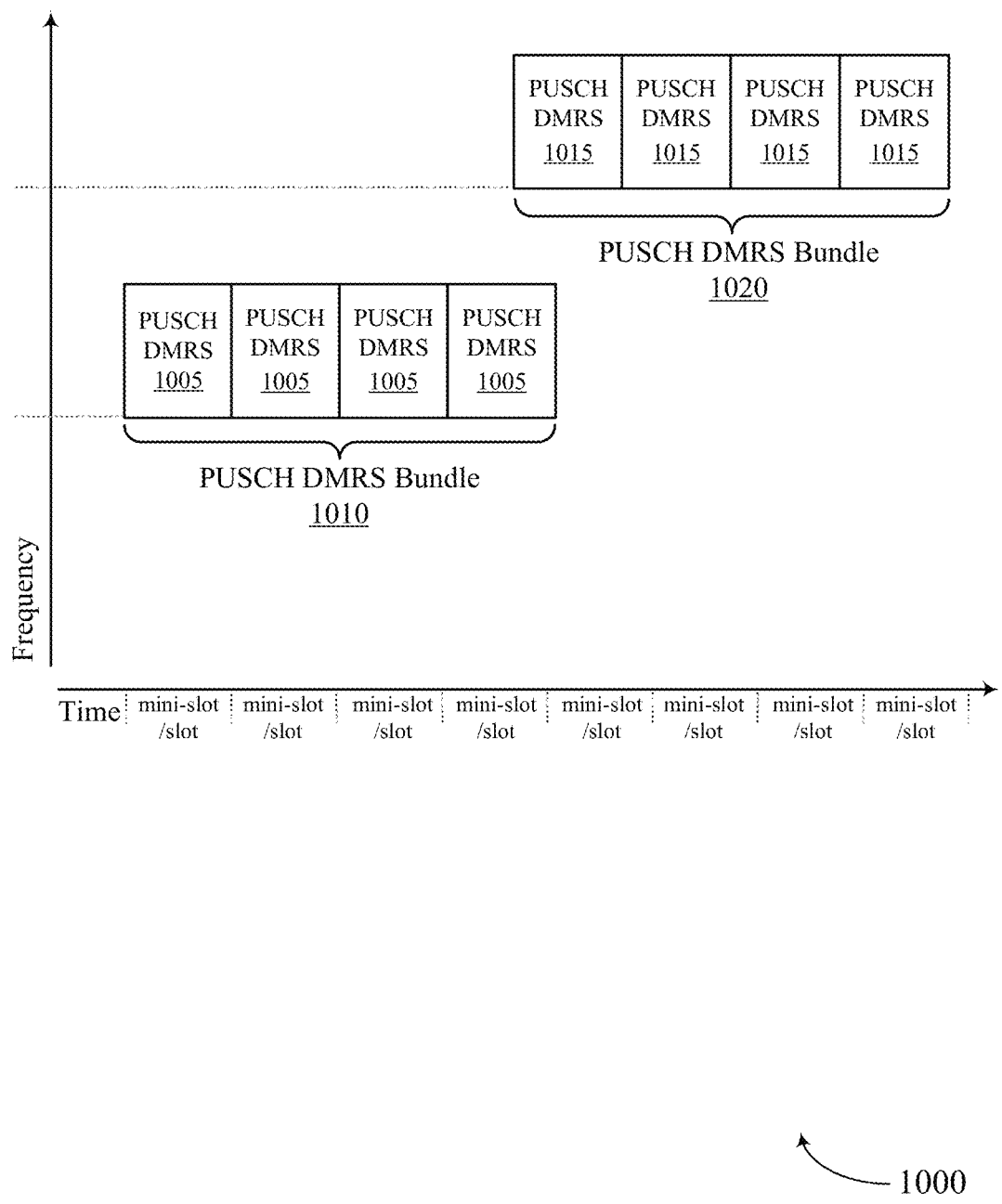

FIG. 10 illustrates an example of a block diagram 1100 that supports PUSCH repetition with DMRS bundling in accordance with aspects of the present disclosure. The block diagram 1000 may implement aspects of the wireless communications system 100 and 200 described with reference to FIGS. 1 and 2, respectively. The block diagram 1000 may implement aspects of the wireless communications system 100 and 200 described with reference to FIGS. 1 and 2, respectively. The block diagram 1000 may be based on a configuration by a base station 105 or a UE 115, and implemented by the UE 115.

In the example illustrated in FIG. 10, the block diagram 1000 is applicable to implementations or instances when the UE 115 is configured with PUSCH DMRS bundling operations to support PUSCH repetition or PUSCH (re)transmission, or both. For example, the block diagram 1000 may include one or more PUSCH DMRS 1005 that may be part of a PUSCH DMRS bundle 1010 and one or more PUSCH DMRS 1015 that may be part of a PUSCH DMRS bundle 1020. The PUSCH DMRS bundle 1010 and the PUSCH DMRS bundle 1020 may correspond to time resources (for example, a symbol duration, a minislot duration, a slot duration, a subframe duration, a frame duration), as well as frequency resources (for example, subcarriers, carriers). For example, each PUSCH DMRS 1005 or 1015 may span a minislot duration or a slot duration. In the example of FIG. 10, the PUSCH DMRS bundle 1010 may relate to a first frequency hop and the PUSCH DMRS bundle 1020 may relate to a second frequency hop different from the first frequency hop. As such, the UE 115 may be configured to use a frequency hopping in a frequency domain to achieve diversity gain for PUSCH. In some examples, PUSCH DMRS bundling may be supported for each hop (i.e., DMRS of PUSCH in a same hop may be bundled).

Figure 11:
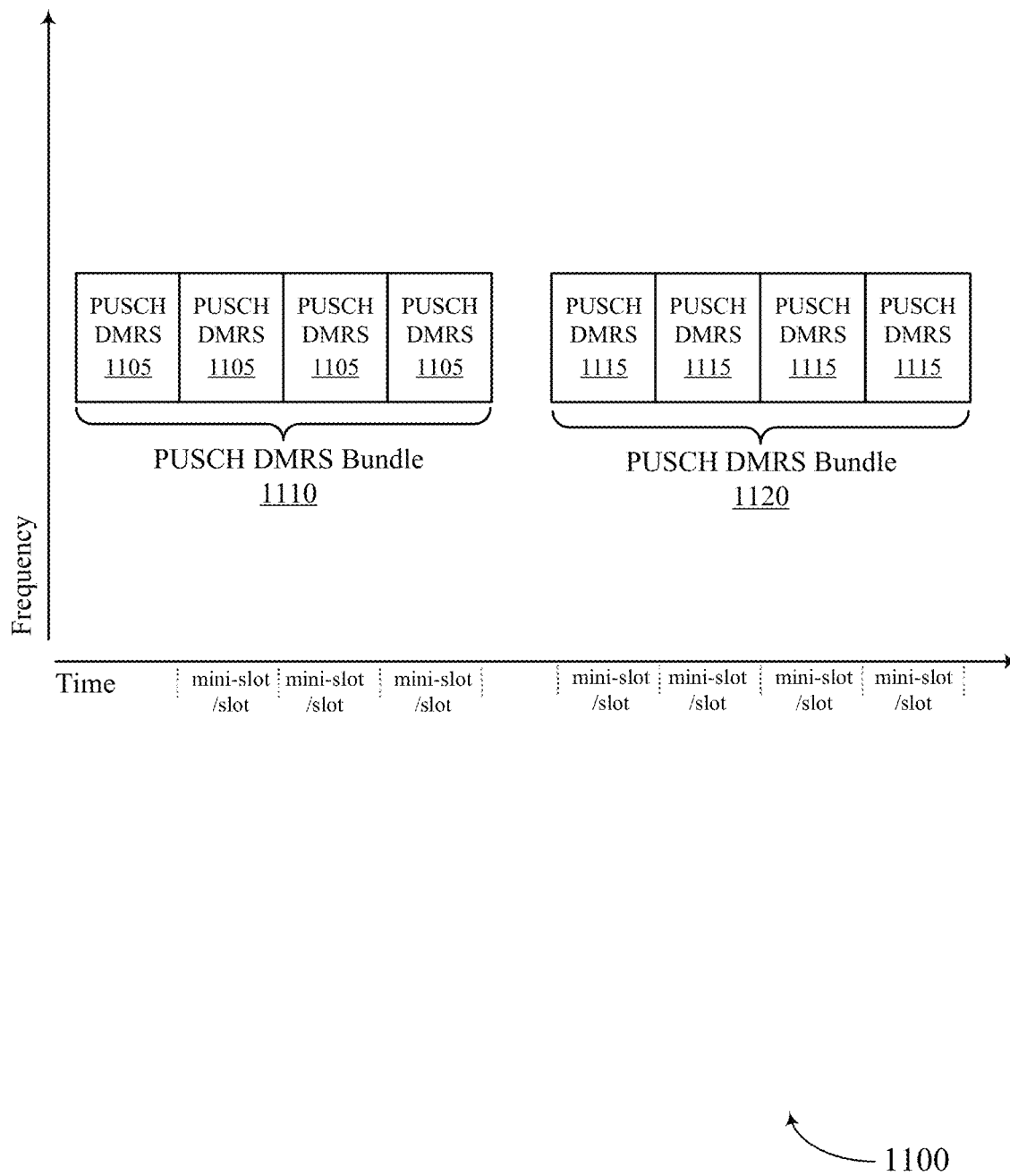

FIG. 11 illustrates an example of a block diagram 1100 that supports PUSCH repetition with DMRS bundling in accordance with aspects of the present disclosure. The block diagram 1100 may implement aspects of the wireless communications system 100 and 200 described with reference to FIGS. 1 and 2, respectively. The block diagram 1100 may implement aspects of the wireless communications system 100 and 200 described with reference to FIGS. 1 and 2, respectively. The block diagram 1100 may be based on a configuration by a base station 105 or a UE 115, and implemented by the UE 115.

In the example illustrated in FIG. 11, the block diagram 1100 is applicable to implementations or instances when the UE 115 is configured with PUSCH DMRS bundling operations to support PUSCH repetition or PUSCH (re)transmission, or both. For example, the block diagram 1100 may include one or more PUSCH DMRS 1105 that may be part of a PUSCH DMRS bundle 1110 and one or more PUSCH DMRS 1115 that may be part of a PUSCH DMRS bundle 1120. The PUSCH DMRS bundle 1110 and the PUSCH DMRS bundle 1120 may correspond to time resources (for example, a symbol duration, a minislot duration, a slot duration, a subframe duration, a frame duration), as well as frequency resources (for example, subcarriers, carriers). For example, each PUSCH DMRS 1105 or 1115 may span a minislot duration or a slot duration. In the example of FIG. 11, there may be no frequency hopping between the PUSCH DMRS bundle 1110 and the PUSCH DMRS bundle 1120.

Returning to FIG. 2 and with reference to FIG. 10, in some examples, a number of symbols, minislots, or slots for PUSCH (e.g., PUSCH transmissions) in a hop of a plurality of hops in a time domain or a frequency domain may be a same or different from another hop of the plurality of hops.

In some example, the base station 105 may transmit an indication of the number of symbols, minislots, or slots for PUSCH in each hop to the UE 115, if the number of symbols, minislots, or slots for PUSCH is different for each hop. Otherwise, the number of symbols, minislots, or slots for PUSCH in each hop may be common for all hops. In some examples, a number of symbols, minislots, or slots for PUSCH DMRS coherent transmission in a hop of a plurality of hops in a time domain or a frequency domain may be a same or different from another hop of the plurality of hops. In some example, the base station 105 may transmit an indication of the number of symbols, minislots, or slots for PUSCH DMRS coherent transmission in each hop to the UE 115, if the number of symbols, minislots, or slots for PUSCH DMRS coherent transmission is different for each hop. Otherwise, the number of symbols, minislots, or slots for PUSCH DMRS coherent transmission in each hop may be common for all hops.

In some examples, the base station 105 may configure the UE 115 to support a constant transmit power for PUSCH carrying the CSI report 205 (e.g., an aperiodic CSI report) for each hop of the plurality of hops, so the UE 115 may maintain a phase continuity for the PUSCH transmission. For example, the base station 105 may configure the UE 115 via a transmit power control (TPC) command to use a transmit power level for the PUSCH carrying the CSI report 205 (e.g., an aperiodic CSI report) for each hop of the plurality of hops. In some examples, the base station 105 may transmit a TPC command for each hop of the plurality of hops, so the UE 115 may adjust a transmit power level for the PUSCH carrying the CSI report 205 (e.g., an aperiodic CSI report) for each hop of the plurality of hops. For example, a transmit power level for a PUSCH in a first hop can be different from a transmit power level for the PUSCH in a second hop.

In some examples, the base station 105 may determine a transmit power level difference between the first hop and the second hop, and transmit an indication of the power level difference to the UE 115 via a system information (SI) signaling or RRC signaling. The UE 115 may perform a power ramp-up operation, for example, from the transmit power level for the first hop to the transmit power level for the second hop based on the indicated transmit power level difference. Alternatively, the transmit power level difference between the first hop and the second hop may be predetermined (e.g., fixed), and the UE 115 may be configured with a power level configuration that may indicate the transmit power level difference. In some examples, the UE 115 may disable the power ramp-up operation for the case with frequency hopping, and enable the power ramp-up operation for the case without frequency hopping.

The operations performed by the base station 105 and the UE 115, for example, may provide improvements to PUSCH DMRS bundling operations related to PUSCH repetition carrying aperiodic CSI reports in the wireless communications system 200. Furthermore, the operations performed by the base station 105 and the UE 115 may provide benefits and enhancements to the operation of the UE 115. For example, by supporting PUSCH DMRS bundling operations related to PUSCH repetition carrying aperiodic CSI reports, the UE 115 may preserve power, while simultaneously supporting higher reliability and lower latency communications, resulting in enhanced power efficiency and network throughput in the wireless communications system 200.

Figure 12:
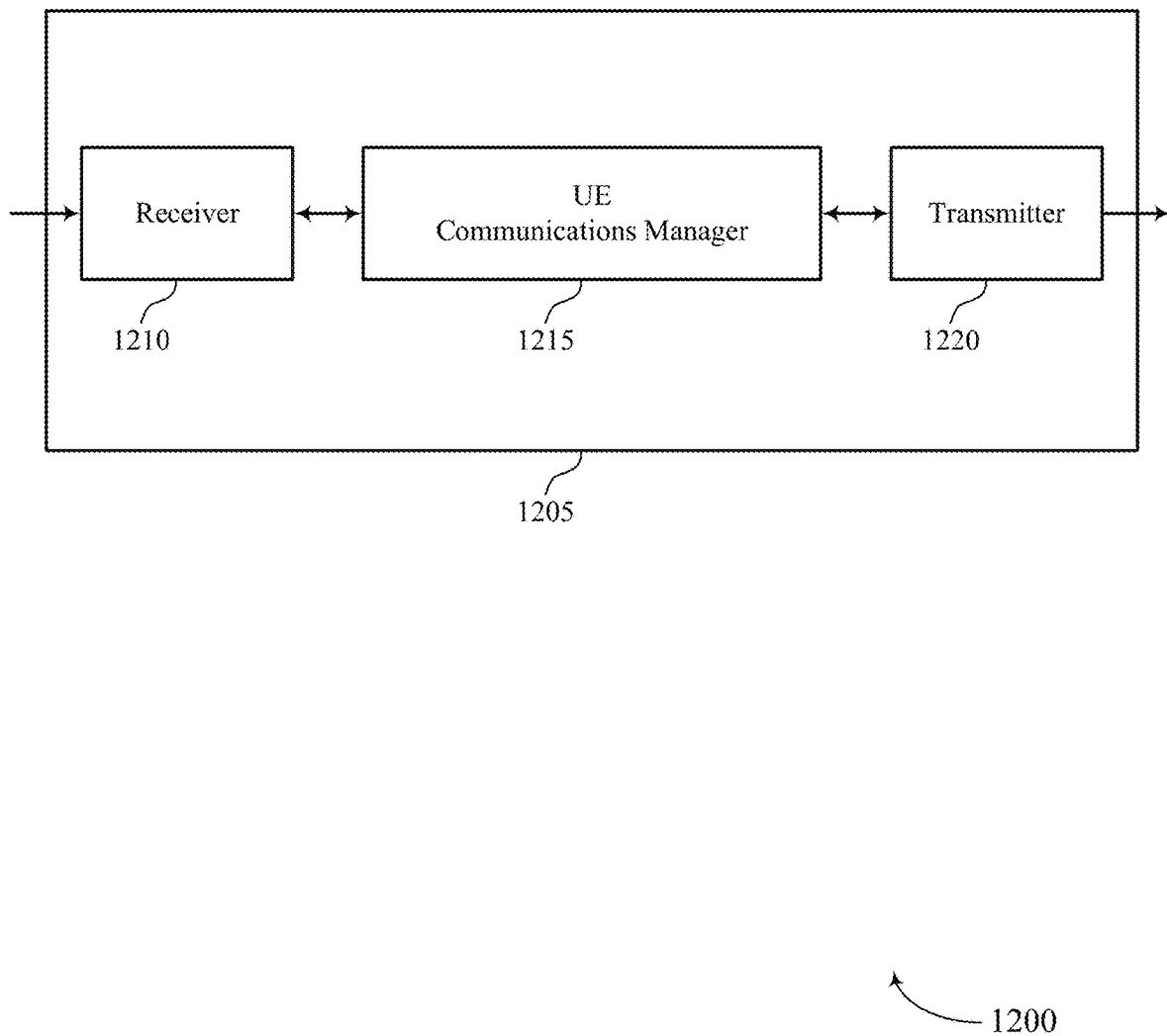
FIGS. 12 and 13 show block diagrams of devices that support PUSCH repetition with DMRS bundling in accordance with aspects of the present disclosure.

FIG. 12 shows a block diagram 1200 of a device 1205 that supports PUSCH repetition with DMRS bundling in accordance with aspects of the present disclosure. The device 1205 may be an example of aspects of a UE 115 as described herein. The device 1205 may include a receiver 1210, a UE communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to PUSCH carrying aperiodic CSI reports, etc.). Information may be passed on to other components of the device 1205. The receiver 1210 may be an example of aspects of the transceiver 1520 described with reference to FIG. 15. The receiver 1210 may utilize a single antenna or a set of antennas.

The UE communications manager 1215 may receive signaling including a CSI reporting configuration, determine one or more resources of a physical uplink channel for aperiodic CSI reporting based on the CSI reporting configuration, and transmit an aperiodic CSI report over the physical uplink channel based on the on the one or more resources. The UE communications manager 1215 may also determine a set of DMRS symbols associated with a hop of a set of hops in a time domain or a frequency domain and coherently transmit, based on the determining, the set of DMRS symbols associated with the hop of the set of hops. The UE communications manager 1215 may be an example of aspects of the UE communications manager 1510 described herein.

The UE communications manager 1215 may as described herein be implemented to realize one or more potential advantages. One implementation may allow the device 1205 to save power and increase battery life by communicating with a base station 105 (as shown in FIG. 2) more efficiently. For example, the device 1205 may extend a coverage of a PUSCH for aperiodic CSI reports. In addition, the device 1205 may experience reduced complexity, better throughput through aperiodic CSI reporting or DMRS bundling, or both. Another implementation may promote higher reliability and lower latency communications at the device 1205 due to aperiodic CSI reporting flexibility of the device 1205, as a result of supporting a PUSCH repetition configuration, as well as a PUSCH (re)transmission configuration.

The UE communications manager 1215, or its sub-components, may be implemented in hardware, code (e.g., software or firmware) executed by a processor, or any combination thereof. If implemented in code executed by a processor, the functions of the UE communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 1215, or its sub-components, may be physically located at various positions, including being distributed such that portions of functions are implemented at different physical locations by one or more physical components. In some examples, the UE communications manager 1215, or its sub-components, may be a separate and distinct component in accordance with various aspects of the present disclosure. In some examples, the UE communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver component. For example, the transmitter 1220 may be an example of aspects of the transceiver 1520 described with reference to FIG. 15. The transmitter 1220 may utilize a single antenna or a set of antennas.

Figure 13:
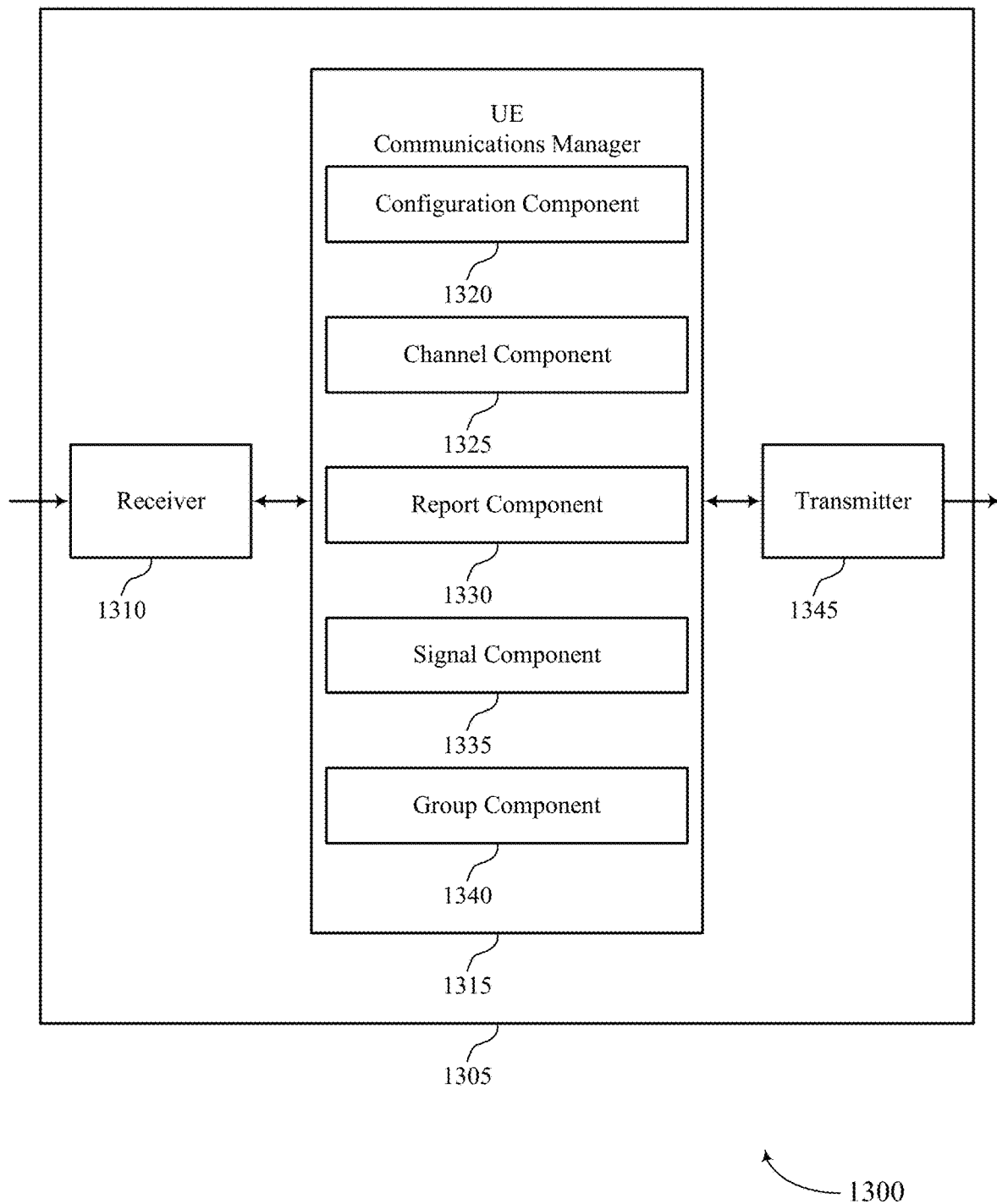

FIG. 13 shows a block diagram 1300 of a device 1305 that supports PUSCH repetition with DMRS bundling in accordance with aspects of the present disclosure. The device 1305 may be an example of aspects of a device 1205, or a UE 115 as described herein. The device 1305 may include a receiver 1310, a UE communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to PUSCH carrying aperiodic CSI reports, etc.). Information may be passed on to other components of the device 1305. The receiver 1310 may be an example of aspects of the transceiver 1520 described with reference to FIG. 15. The receiver 1310 may utilize a single antenna or a set of antennas.

The UE communications manager 1315 may be an example of aspects of the UE communications manager 1215 as described herein. The UE communications manager 1315 may include a configuration component 1320, a channel component 1325, a report component 1330, a signal component 1335, and a group component 1340. The UE communications manager 1315 may be an example of aspects of the UE communications manager 1510 described herein.

The configuration component 1320 may receive signaling including a CSI reporting configuration. The channel component 1325 may determine one or more resources of a physical uplink channel for aperiodic CSI reporting based on the CSI reporting configuration. The report component 1330 may transmit an aperiodic CSI report over the physical uplink channel based on the on the one or more resources. The signal component 1335 may determine a set of DMRS symbols associated with a hop of a set of hops in a time domain or a frequency domain. The group component 1340 may coherently transmit, based on the determining, the set of DMRS symbols associated with the hop of the set of hops.

The transmitter 1345 may transmit signals generated by other components of the device 1305. In some examples, the transmitter 1345 may be collocated with a receiver 1310 in a transceiver component. For example, the transmitter 1345 may be an example of aspects of the transceiver 1520 described with reference to FIG. 15. The transmitter 1345 may utilize a single antenna or a set of antennas.

Figure 14:
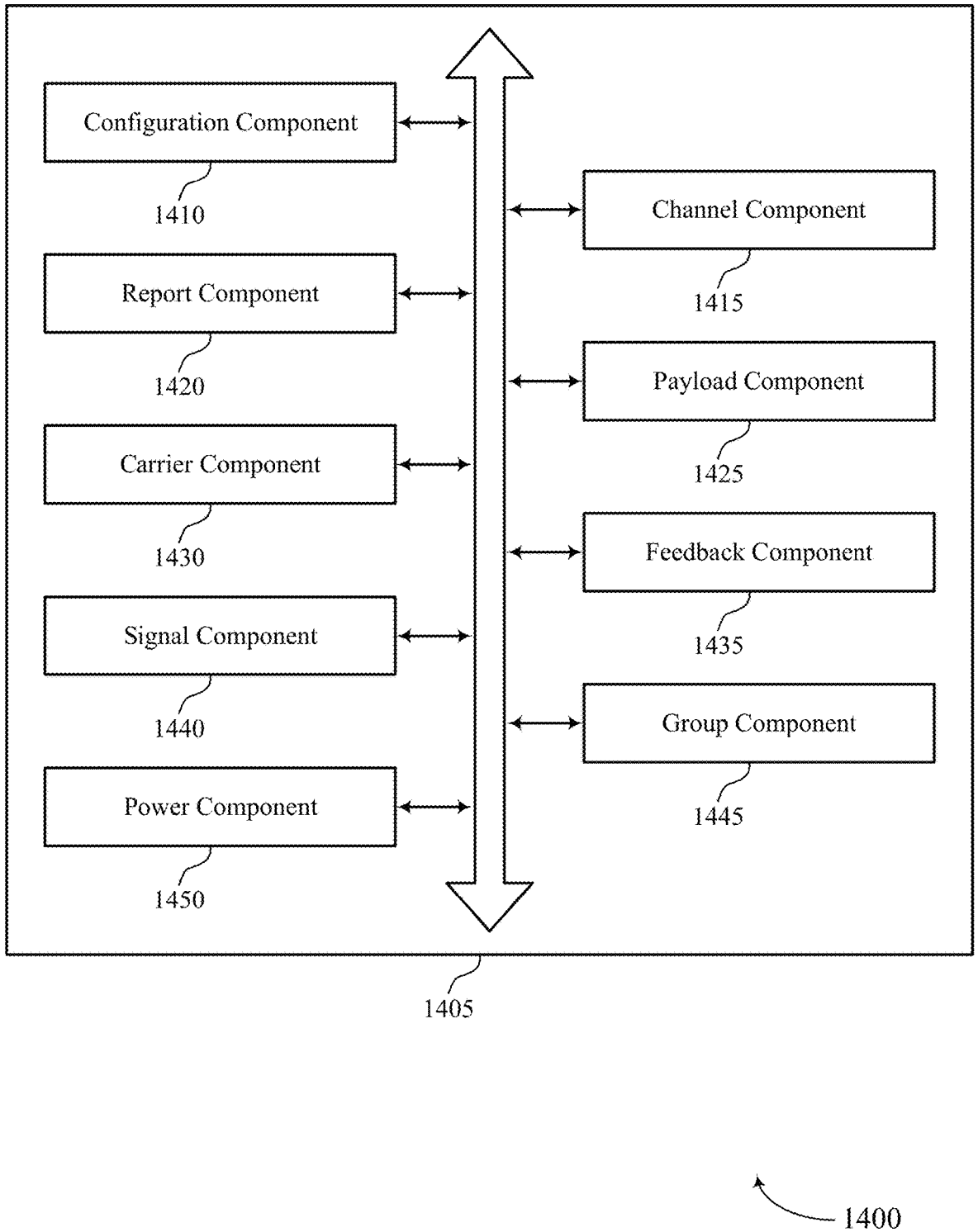
FIG. 14 shows a block diagram of a UE communications manager that supports PUSCH repetition with DMRS bundling in accordance with aspects of the present disclosure.

FIG. 14 shows a block diagram 1400 of a UE communications manager 1405 that supports PUSCH repetition with DMRS bundling in accordance with aspects of the present disclosure. The UE communications manager 1405 may be an example of aspects of a UE communications manager 1215, a UE communications manager 1315, or a UE communications manager 1510 described herein. The UE communications manager 1405 may include a configuration component 1410, a channel component 1415, a report component 1420, a payload component 1425, a carrier component 1430, a feedback component 1435, a signal component 1440, a group component 1445, and a power component 1450. Each of these components may communicate, directly or indirectly, with one another (e.g., via one or more buses).

The configuration component 1410 may receive signaling including a CSI reporting configuration. The CSI reporting configuration includes a PUSCH repetition configuration. The configuration component 1410 may determine the one or more resources of the PUSCH for the aperiodic CSI reporting by determining the one or more resources of the physical uplink channel based on the PUSCH repetition configuration. In some examples, the configuration component 1410 may determine a PUSCH repetition based on the PUSCH repetition configuration, where transmitting the aperiodic CSI report includes transmitting the aperiodic CSI report over the physical uplink channel according to the PUSCH repetition. In some examples, the PUSCH repetition includes repetition of the physical uplink channel over the one or more resources including mini-slots or slots. In some examples, the repetition of the physical uplink channel over the one or more resources is consecutive. In some examples, the repetition of the physical uplink channel over the one or more resources is nonconsecutive.

The configuration component 1410 may determine to transmit the aperiodic CSI report on the physical uplink channel based on the CSI reporting configuration, the physical uplink channel including a PUSCH, where transmitting the aperiodic CSI report includes transmitting the aperiodic CSI report on the PUSCH based on the determining. In some examples, the configuration component 1410 may determine that the PUSCH is configured to exclusively carry the aperiodic CSI report based on the CSI reporting configuration. In some examples, the configuration component 1410 may determine that the PUSCH is configured to jointly carry the aperiodic CSI report and a transport channel, where the transport channel includes an UL-SCH. In some examples, the configuration component 1410 may transmit jointly the aperiodic CSI report and the UL-SCH on the PUSCH. In some cases, the CSI reporting configuration includes one or more of a PUSCH repetition configuration or a PUSCH (re)transmission configuration. In some cases, the PUSCH repetition includes a repetition of the physical uplink channel over the one or more resources including mini-slots or slots. In some cases, the signaling includes RRC signaling. In some cases, the signaling includes downlink control signaling. In some cases, the signaling includes MAC-CE signaling.

The configuration component 1410 may receive signaling including an indication of a set of DMRS symbols associated with a hop of a set of hops, where determining a set of DMRS symbols is based on the indication. In some examples, the configuration component 1410 may receive signaling including an indication of a second set of DMRS symbols associated with a second hop of the set of hops, where determining a second set of DMRS symbols is based on the indication. In some examples, the configuration component 1410 may receive signaling including an indication of the set of resources of the one or more physical uplink channels associated with the second hop of the set of hops, where determining the set of resources of the one or more physical uplink channels associated with the second hop of the set of hops is based on the indication, the set of resources including a set of symbols or a set of slots. In some cases, a quantity of resources of a set of resources of the one or more physical uplink channels associated with the hop of the set of hops and a quantity of resources of the set of resources of the one or more physical uplink channels associated with the second hop of the set of hops is different.

The channel component 1415 may determine one or more resources of the physical uplink channel for aperiodic CSI reporting based on the CSI reporting configuration. In some examples, the channel component 1415 may determine the one or more resources of the physical uplink channel based on the PUSCH repetition configuration. In some examples, the channel component 1415 may determine the one or more resources of the physical uplink channel based on the PUSCH (re)transmission configuration. In some examples, the channel component 1415 may determine a set of resources of one or more physical uplink channels associated with the hop of the set of hops in the time domain or the frequency domain. In some examples, the channel component 1415 may receive signaling including an indication of the set of resources of the one or more physical uplink channels associated with the hop of the set of hops, where determining the set of resources of the one or more physical uplink channels associated with the hop of the set of hops is based on the indication, the set of resources including a set of symbols or a set of slots.

In some examples, the channel component 1415 may determine a set of resources of one or more physical uplink channels associated with the second hop of the set of hops in the time domain or the frequency domain. In some cases, the one or more resources of the physical uplink channel includes one or more mini-slots. In some cases, the one or more resources of the physical uplink channel includes one or more slots.

The report component 1420 may transmit an aperiodic CSI report over the physical uplink channel based on the on the one or more resources. In some examples, the report component 1420 may transmit the aperiodic CSI report exclusively on the PUSCH. In some examples, the report component 1420 may identify that the UE is not configured with PUSCH repetition or PUSCH (re)transmission, or both when the physical uplink channel is scheduled to carry the aperiodic CSI report and a transport channel, where the transport channel includes an UL-SCH. In some examples, the report component 1420 may refrain from transmitting the transport channel on the PUSCH based on the identifying.

The signal component 1440 may determine a set of DMRS symbols associated with a hop of a set of hops in a time domain or a frequency domain. In some examples, the signal component 1440 may determine a second set of DMRS symbols associated with a second hop of the set of hops in the time domain or the frequency domain. In some cases, a quantity of DMRSs of the set of DMRSs associated with the hop of the set of hops and a quantity of DMRSs of the second set of DMRSs associated with the second hop of the set of hops is different.

The group component 1445 may coherently transmit, based on the determining, the set of DMRS symbols associated with the hop of the set of hops. In some examples, the group component 1445 may coherently transmit, based on the determining, the second set of DMRS symbols associated with the second hop of the set of hops. The payload component 1425 may determine a payload size of the aperiodic CSI report. In some examples, the payload component 1425 may determine that the payload size of the aperiodic CSI report satisfies a threshold, where transmitting the aperiodic CSI report includes. In some cases, the threshold includes a coding rate for the aperiodic CSI report.

The carrier component 1430 may identify a bit indication in an RRC configuration or in a DCI message. In some examples, determining, based on the bit indication, a number of component carriers for the aperiodic CSI reporting and a repetition factor associated with the aperiodic CSI reporting, where transmitting the aperiodic CSI report includes transmitting the aperiodic CSI over the physical uplink channel according to the number of component carriers and the repetition factor. The bit indication may include a multibit indication.

In some examples, the carrier component 1430 may receive a control message including an indication of a component carrier for the aperiodic CSI report. In some examples, the carrier component 1430 may determine a PUSCH repetition based on the PUSCH repetition configuration, where transmitting the aperiodic CSI report includes transmitting the aperiodic CSI report over the physical uplink channel on the component carrier according to the PUSCH repetition, wherein the PUSCH repetition is transmitted on the component carrier.

In some examples, the carrier component 1430 may receive a control message including an indication of one or more component carriers for the aperiodic CSI report. In some examples, the carrier component 1430 may receive a control message including an indication of a component carrier for the aperiodic CSI report, where transmitting the aperiodic CSI report includes transmitting the aperiodic CSI report over the physical uplink channel and on the component carrier indicated in the control message. In some examples, the carrier component 1430 may retransmit, based on the feedback message, the aperiodic CSI report on the component carrier indicated in the control message.

In some examples, the carrier component 1430 may retransmit, based on the feedback message, the aperiodic CSI report on a different component carrier from the component carrier indicated in the control message. In some cases, the bit indication includes a multibit indication. In some cases, the second component carrier is different from the first component carrier. In some cases, the first component carrier and the second component carrier correspond to consecutive mini-slots or slots. In some cases, the first component carrier and the second component carrier correspond to nonconsecutive mini-slots or slots.

The feedback component 1435 may receive a feedback message associated with the aperiodic CSI report based on the transmitting. In some examples, the feedback component 1435 may retransmit, based on the feedback message, the aperiodic CSI report over the physical uplink channel according to the PUSCH (re)transmission configuration. In some examples, the feedback component 1435 may receive a second signaling including a second CSI reporting configuration for periodic CSI reporting or semi-persistent CSI reporting. In some examples, the feedback component 1435 may transmit, based on the feedback message, a periodic CSI report or a semi-persistent CSI report according to the second CSI reporting configuration.

The power component 1450 may determine a transmit power for one or more physical uplink channels associated with the hop of the set of hops. In some examples, the power component 1450 may transmit the one more physical uplink channels associated with the hop of the set of hops according to the transmit power, where the transmit power is constant over the hop of the set of hops. In some examples, the power component 1450 may determine a second transmit power for one or more physical uplink channels associated with a second hop of the set of hops. In some examples, the power component 1450 may transmit the one more physical uplink channels associated with the second hop of the set of hops according to the second transmit power, where the second transmit power is constant over the second hop of the set of hops.

In some examples, the power component 1450 may receive signaling including an indication of a difference between the transmit power and the second transmit power. In some examples, the power component 1450 may determine a difference between the transmit power and the second transmit power based on a parameter. In some examples, the power component 1450 may perform, based on an absence of a frequency hopping associated with the set of hops, a power ramping operation according to the difference between the transmit power and the second transmit power. In some cases, the transmit power is different from the second transmit power. In some cases, the signaling includes RRC signaling. In some cases, the signaling includes SI signaling.

Figure 15:
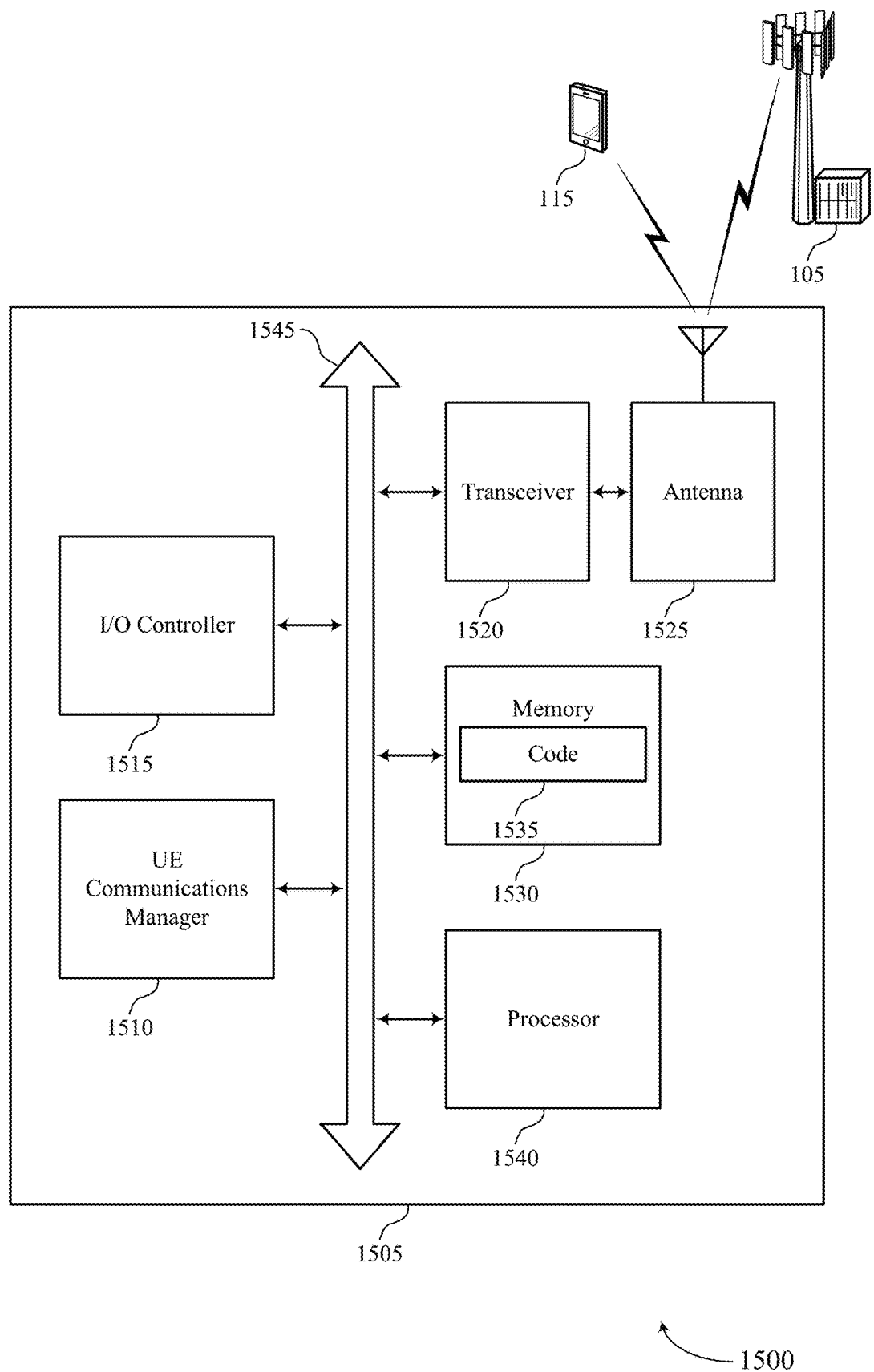
FIG. 15 shows a diagram of a system including a device that supports PUSCH repetition with DMRS bundling in accordance with aspects of the present disclosure.

FIG. 15 shows a diagram of a system 1500 including a device 1505 that supports PUSCH repetition with DMRS bundling in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a UE communications manager 1510, an I/O controller 1515, a transceiver 1520, an antenna 1525, memory 1530, and a processor 1540. These components may be in electronic communication via one or more buses (e.g., bus 1545).

The UE communications manager 1510 may receive signaling including a CSI reporting configuration, determine one or more resources of a physical uplink channel for aperiodic CSI reporting based on the CSI reporting configuration, and transmit an aperiodic CSI report over the physical uplink channel based on the on the one or more resources. The UE communications manager 1510 may also determine a set of DMRS symbols associated with a hop of a set of hops in a time domain or a frequency domain and coherently transmit, based on the determining, the set of DMRS symbols associated with the hop of the set of hops.

The device 1505 may as described herein be implemented to realize one or more potential advantages. One implementation may allow the device 1505 to save power and increase battery life by communicating with a base station 105 (as shown in FIG. 2) more efficiently. For example, the device 1505 may extend a coverage of a PUSCH for aperiodic CSI reports. In addition, the device 1505 may experience reduced complexity, better throughput through aperiodic CSI reporting or DMRS bundling, or both. Another implementation may promote higher reliability and lower latency communications at the device 1505 due to aperiodic CSI reporting flexibility of the device 1505, as a result of supporting a PUSCH repetition configuration, as well as a PUSCH (re)transmission configuration.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases the device 1505 may have more than one antenna 1525, which may be capable of concurrently transmitting or receiving multiple wireless transmissions.

The memory 1530 may include RAM and ROM. The memory 1530 may store computer-readable, computer-executable code 1535 including instructions that, when executed, cause the processor to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting PUSCH carrying aperiodic CSI reports).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
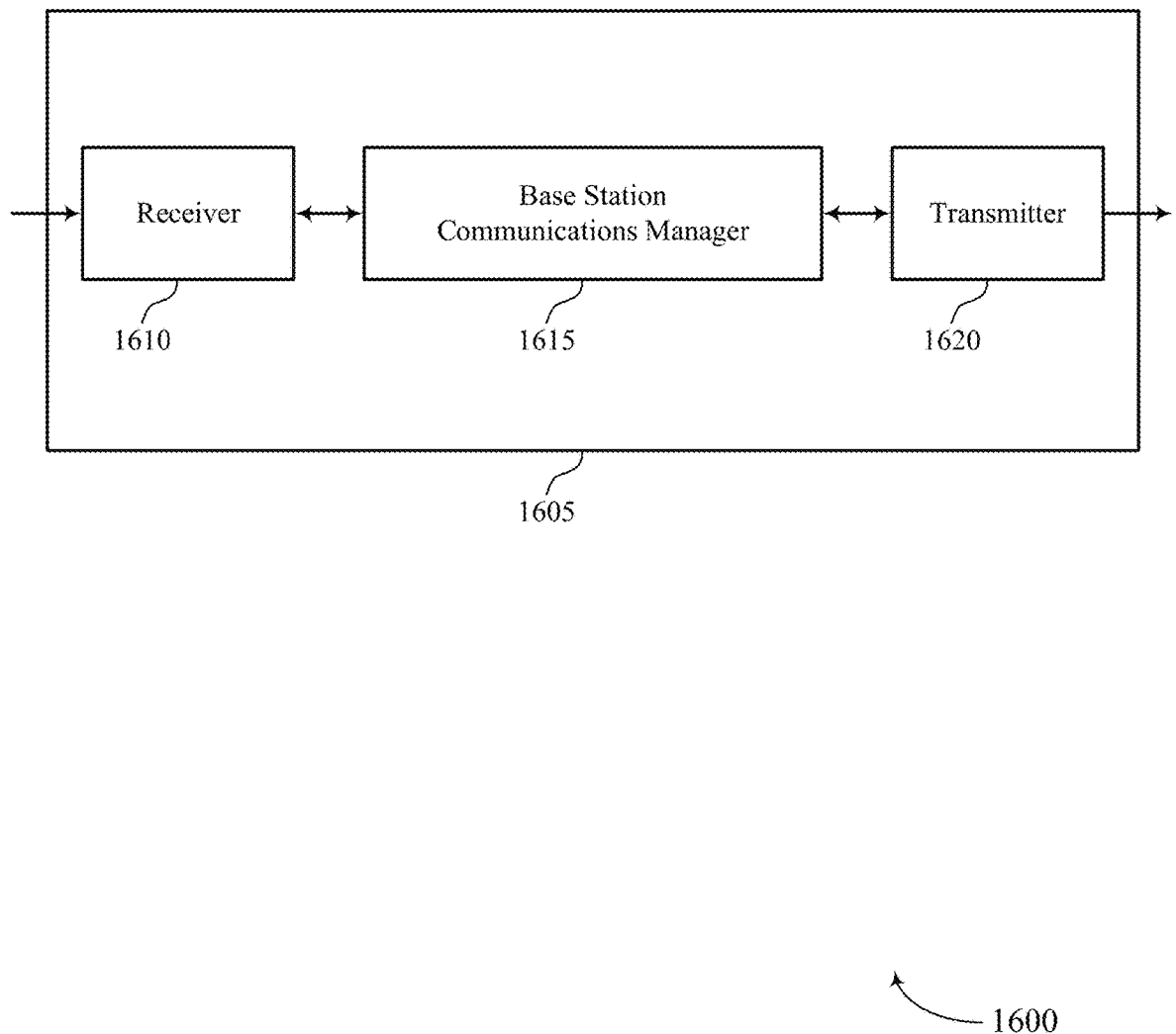
FIGS. 16 and 17 show block diagrams of devices that support PUSCH repetition with DMRS bundling in accordance with aspects of the present disclosure.

FIG. 16 shows a block diagram 1600 of a device 1605 that supports PUSCH repetition with DMRS bundling in accordance with aspects of the present disclosure. The device 1605 may be an example of aspects of a base station 105 as described herein. The device 1605 may include a receiver 1610, a base station communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to PUSCH carrying aperiodic CSI reports, etc.). Information may be passed on to other components of the device 1605. The receiver 1610 may be an example of aspects of the transceiver 1920 described with reference to FIG. 19. The receiver 1610 may utilize a single antenna or a set of antennas.

The base station communications manager 1615 may determine one or more resources of a physical uplink channel for aperiodic CSI reporting, transmit signaling including a CSI reporting configuration including an indication of the one or more resources of the physical uplink channel for the aperiodic CSI reporting, and receive an aperiodic CSI report based on the transmitting. The base station communications manager 1615 may also determine a first set of DMRS symbols associated with a first hop of a set of hops in a time domain or a frequency domain, determine a second set of DMRS symbols associated with a second hop of the set of hops in the time domain or the frequency domain, and transmit signaling including an indication of one or more of the first set of DMRS symbols associated with a first hop or the second set of DMRS symbols associated with the second hop. The base station communications manager 1615 may be an example of aspects of the base station communications manager 1910 described herein.

The base station communications manager 1615, or its sub-components, may be implemented in hardware, code (e.g., software or firmware) executed by a processor, or any combination thereof. If implemented in code executed by a processor, the functions of the base station communications manager 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1615, or its sub-components, may be physically located at various positions, including being distributed such that portions of functions are implemented at different physical locations by one or more physical components. In some examples, the base station communications manager 1615, or its sub-components, may be a separate and distinct component in accordance with various aspects of the present disclosure. In some examples, the base station communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver component. For example, the transmitter 1620 may be an example of aspects of the transceiver 1920 described with reference to FIG. 19. The transmitter 1620 may utilize a single antenna or a set of antennas.

Figure 17:
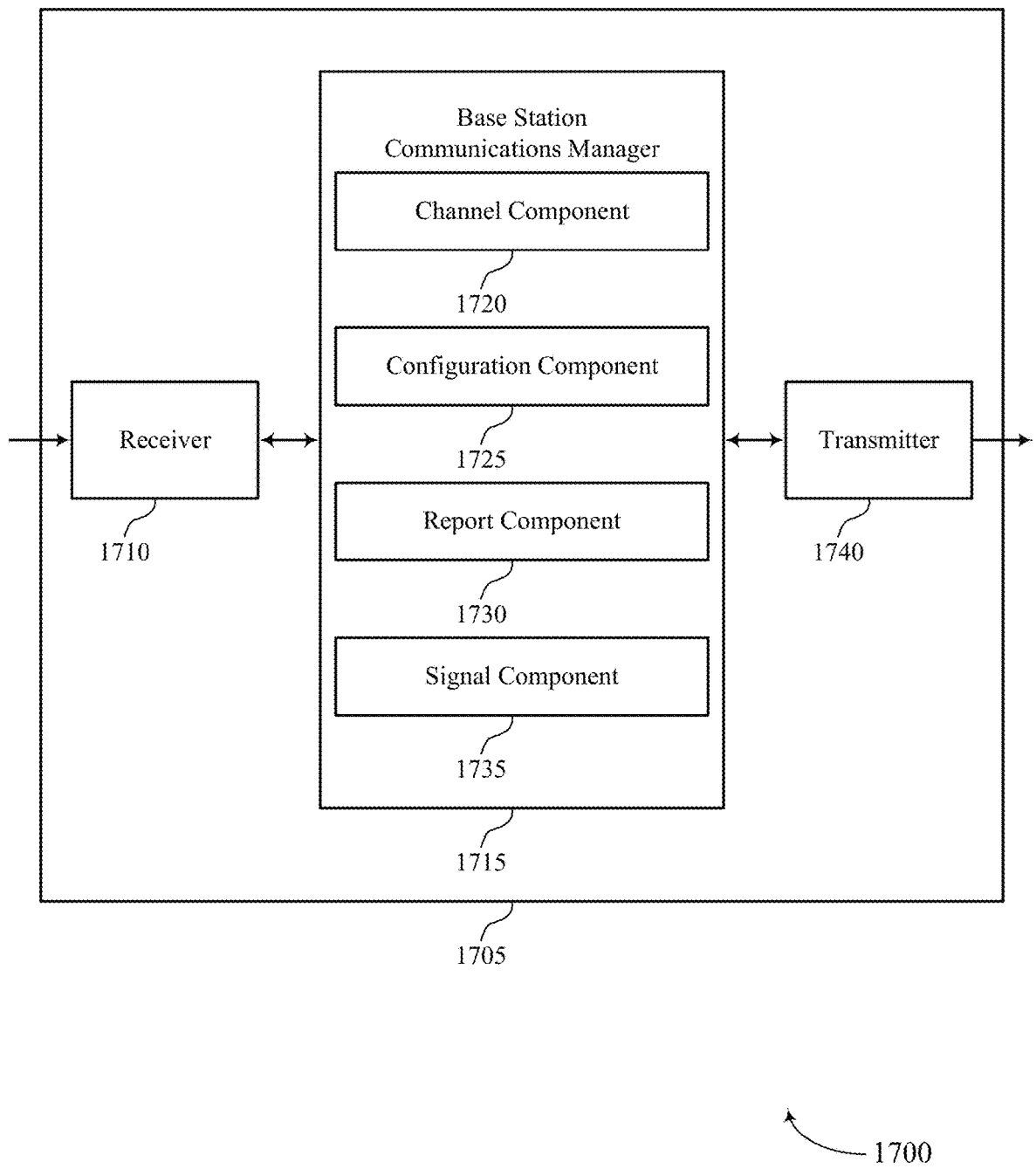

FIG. 17 shows a block diagram 1700 of a device 1705 that supports PUSCH repetition with DMRS bundling in accordance with aspects of the present disclosure. The device 1705 may be an example of aspects of a device 1605, or a base station 105 as described herein. The device 1705 may include a receiver 1710, a base station communications manager 1715, and a transmitter 1740. The device 1705 may also include a processor. Each of these components may be in communication with one another (e.g., via one or more buses).

The receiver 1710 may receive information such as packets, user data, or control information associated with various information channels (e.g., control channels, data channels, and information related to PUSCH carrying aperiodic CSI reports, etc.). Information may be passed on to other components of the device 1705. The receiver 1710 may be an example of aspects of the transceiver 1920 described with reference to FIG. 19. The receiver 1710 may utilize a single antenna or a set of antennas.

The base station communications manager 1715 may be an example of aspects of the base station communications manager 1615 as described herein. The base station communications manager 1715 may include a channel component 1720, a configuration component 1725, a report component 1730, and a signal component 1735. The base station communications manager 1715 may be an example of aspects of the base station communications manager 1910 described herein.

The channel component 1720 may determine one or more resources of a physical uplink channel for aperiodic CSI reporting. The configuration component 1725 may transmit signaling including a CSI reporting configuration including an indication of the one or more resources of the physical uplink channel for the aperiodic CSI reporting. The report component 1730 may receive an aperiodic CSI report based on the transmitting.

The signal component 1735 may determine a first set of DMRS symbols associated with a first hop of a set of hops in a time domain or a frequency domain and determine a second set of DMRS symbols associated with a second hop of the set of hops in the time domain or the frequency domain. The configuration component 1725 may transmit signaling including an indication of one or more of the first set of DMRS symbols associated with a first hop or the second set of DMRS symbols associated with the second hop.

The transmitter 1740 may transmit signals generated by other components of the device 1705. In some examples, the transmitter 1740 may be collocated with a receiver 1710 in a transceiver component. For example, the transmitter 1740 may be an example of aspects of the transceiver 1920 described with reference to FIG. 19. The transmitter 1740 may utilize a single antenna or a set of antennas.

Figure 18:
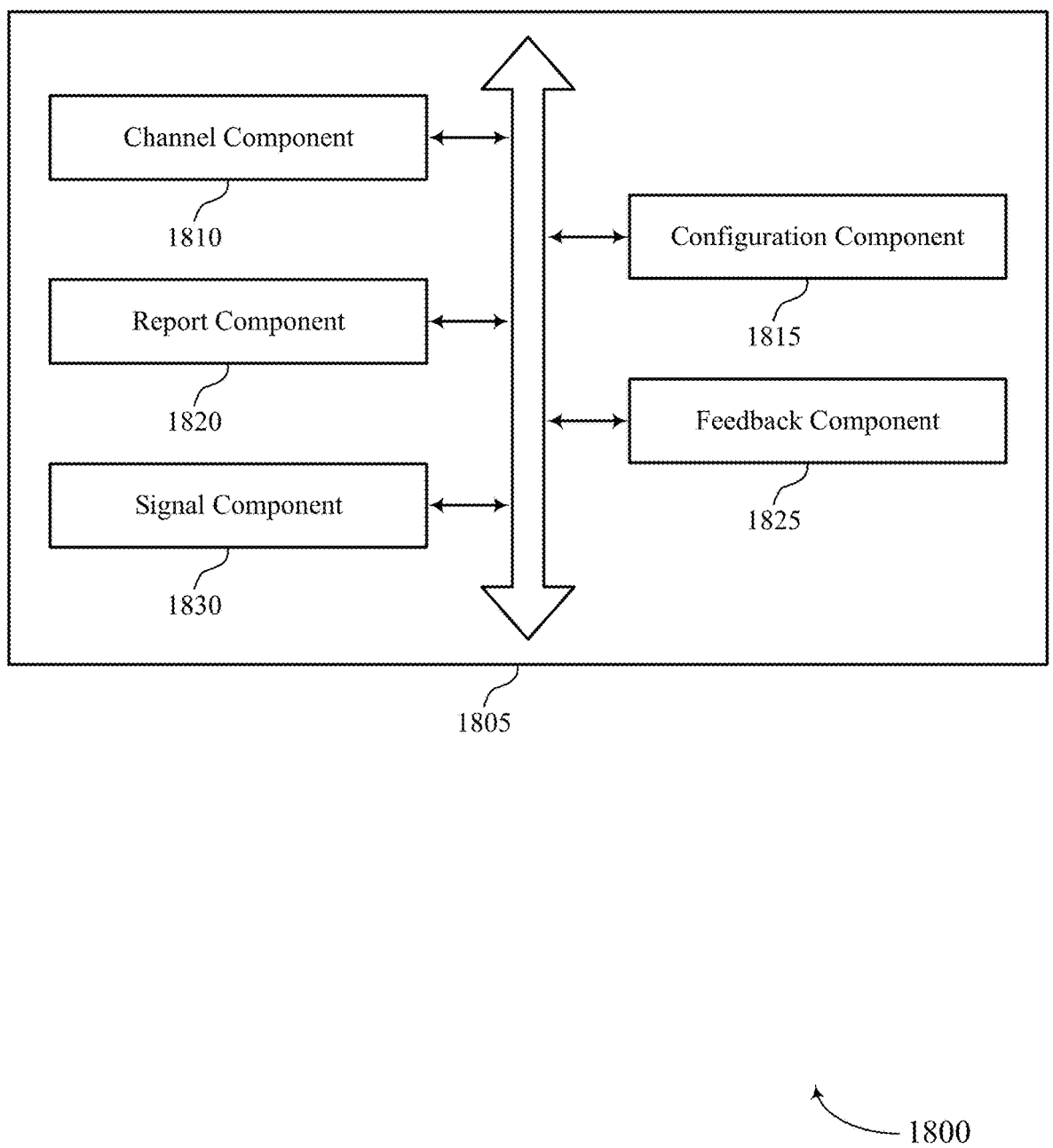
FIG. 18 shows a block diagram of a base station communications manager that supports PUSCH repetition with DMRS bundling in accordance with aspects of the present disclosure.

FIG. 18 shows a block diagram 1800 of a base station communications manager 1805 that supports PUSCH repetition with DMRS bundling in accordance with aspects of the present disclosure. The base station communications manager 1805 may be an example of aspects of a base station communications manager 1615, a base station communications manager 1715, or a base station communications manager 1910 described herein. The base station communications manager 1805 may include a channel component 1810, a configuration component 1815, a report component 1820, a feedback component 1825, and a signal component 1830. Each of these components may communicate, directly or indirectly, with one another (e.g., via one or more buses).

The channel component 1810 may determine one or more resources of a physical uplink channel for aperiodic CSI reporting. In some cases, the one or more resources of the physical uplink channel includes one or more mini-slots. In some cases, the one or more resources of the physical uplink channel includes one or more slots.

The configuration component 1815 may transmit signaling including a CSI reporting configuration including an indication of the one or more resources of the physical uplink channel for the aperiodic CSI reporting. In some cases, the CSI reporting configuration includes one or more of a PUSCH repetition configuration or a PUSCH (re) transmission configuration. In some cases, the PUSCH repetition configuration corresponds to a PUSCH repetition associated with the physical uplink channel. In some cases, the PUSCH repetition includes a repetition of the PUSCH over the one or more resources including mini-slots or slots. In some cases, the repetition of the PUSCH over the one or more resources is consecutive. In some cases, the repetition of the PUSCH over the one or more resources is nonconsecutive.

In some examples, the configuration component 1815 may transmit signaling including an indication of one or more of the first set of DMRS symbols associated with a first hop or the second set of DMRS symbols associated with the second hop. In some examples, the configuration component 1815 may transmit a control message including a second indication of one or more component carriers for the aperiodic CSI report. In some examples, transmitting a control message including a second indication of a component carrier for the aperiodic CSI report, where receiving the aperiodic CSI report includes receiving the aperiodic CSI report on the component carrier indicated in the control message.

In some examples, the configuration component 1815 may determine a first set of resources of one or more physical uplink channels associated with the first hop of the set of hops. In some examples, the configuration component 1815 may determine a second set of resources of one or more physical uplink channels associated with the second hop of the set of hops. In some examples, the configuration component 1815 may transmit a second signaling including a second indication of one or more of the first set of resources of the one or more physical uplink channels associated with the first hop or the second set of resources of the one or more physical uplink channels associated with the second hop.

In some examples, the configuration component 1815 may transmit signaling including an indication of a difference between a first transmit power associated with the first hop and a second transmit power associated with the second hop. In some cases, the signaling includes RRC signaling. In some cases, the signaling includes downlink control signaling. In some cases, the signaling includes MAC-CE signaling. In some cases, a quantity of resources of the first set of resources of the one or more physical uplink channels associated with the first hop and a quantity of resources of the second set of resources of the one or more physical uplink channels associated with the second hop are different. In some cases, the signaling includes RRC signaling. In some cases, the signaling includes SI signaling.

The report component 1820 may receive an aperiodic CSI report based on the transmitting. In some examples, the report component 1820 may receive the aperiodic CSI report exclusively on the PUSCH. In some examples, the report component 1820 may receive jointly the aperiodic CSI report and an UL-SCH on the PUSCH. The signal component 1830 may determine a first set of DMRS symbols associated with a first hop of a set of hops in a time domain or a frequency domain. In some examples, the signal component 1830 may determine a second set of DMRS symbols associated with a second hop of the set of hops in the time domain or the frequency domain. In some cases, a quantity of DMRS symbols of the first set of DMRS symbols associated with the first hop and a quantity of DMRS symbols of the second set of DMRS symbols associated with the second hop are different.

The feedback component 1825 may transmit a feedback message associated with the aperiodic CSI report based on the receiving. In some examples, the feedback component 1825 may receive a (re)transmission of the aperiodic CSI report based on the feedback message. In some examples, the feedback component 1825 may transmit a second signaling including a second CSI reporting configuration for periodic CSI reporting or semi-persistent CSI reporting. In some examples, the feedback component 1825 may receive, based on the feedback message, a periodic CSI report or a semi-persistent CSI report according to the second CSI reporting configuration.

Figure 19:
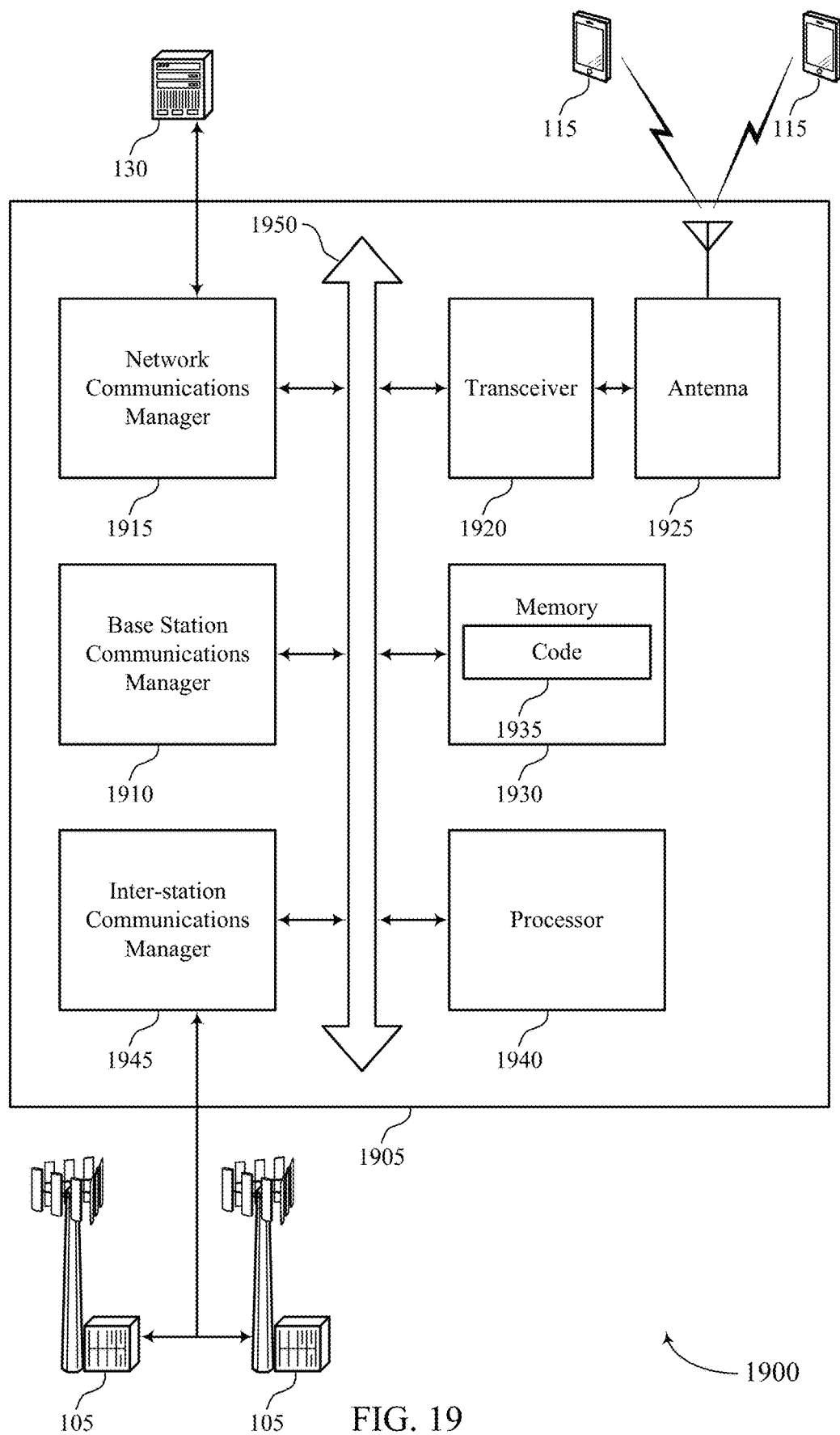
FIG. 19 shows a diagram of a system including a device that supports PUSCH repetition with DMRS bundling in accordance with aspects of the present disclosure.

FIG. 19 shows a diagram of a system 1900 including a device 1905 that supports PUSCH repetition with DMRS bundling in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a base station communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The base station communications manager 1910 may determine one or more resources of a physical uplink channel for aperiodic CSI reporting, transmit signaling including a CSI reporting configuration including an indication of the one or more resources of the physical uplink channel for the aperiodic CSI reporting, and receive an aperiodic CSI report based on the transmitting. The base station communications manager 1910 may also determine a first set of DMRS symbols associated with a first hop of a set of hops in a time domain or a frequency domain, determine a second set of DMRS symbols associated with a second hop of the set of hops in the time domain or the frequency domain, and transmit signaling including an indication of one or more of the first set of DMRS symbols associated with a first hop or the second set of DMRS symbols associated with the second hop.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas. In some cases, the device 1905 may include a single antenna 1925. However, in some cases the device 1905 may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting PUSCH carrying aperiodic CSI reports).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
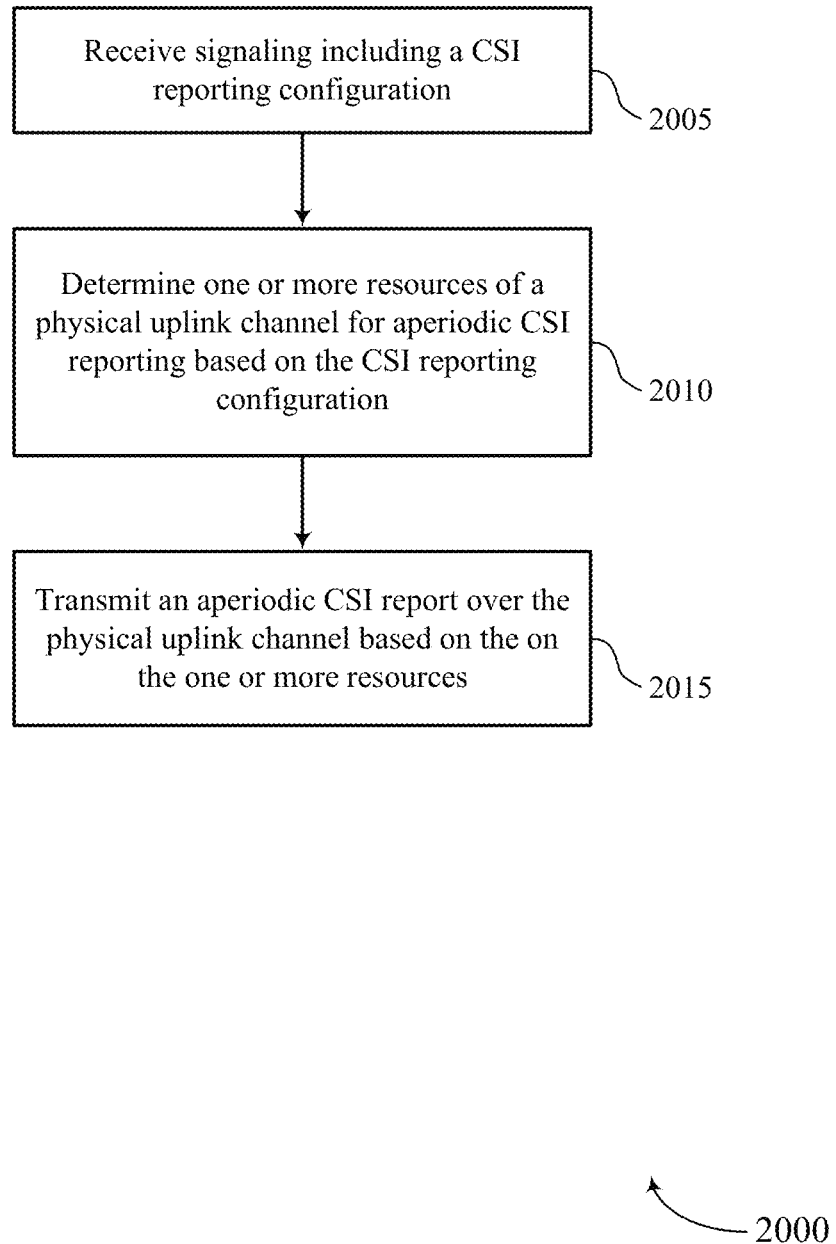
FIGS. 20 through 23 show flowcharts illustrating methods that support PUSCH repetition with DMRS bundling in accordance with aspects of the present disclosure.

FIG. 20 shows a flowchart illustrating a method 2000 that supports PUSCH repetition with DMRS bundling in accordance with aspects of the present disclosure. The operations of method 2000 may be implemented by a UE 115 or its components as described herein. For example, the operations of method 2000 may be performed by a UE communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2005, the UE may receive signaling including a CSI reporting configuration. The operations of 2005 may be performed according to the methods described herein. In some examples, aspects of the operations of 2005 may be performed by a configuration component as described with reference to FIGS. 12 through 15.

At 2010, the UE may determine one or more resources of a physical uplink channel for aperiodic CSI reporting based on the CSI reporting configuration. The operations of 2010 may be performed according to the methods described herein. In some examples, aspects of the operations of 2010 may be performed by a channel component as described with reference to FIGS. 12 through 15.

At 2015, the UE may transmit an aperiodic CSI report over the physical uplink channel based on the on the one or more resources. The operations of 2015 may be performed according to the methods described herein. In some examples, aspects of the operations of 2015 may be performed by a report component as described with reference to FIGS. 12 through 15.

Figure 21:
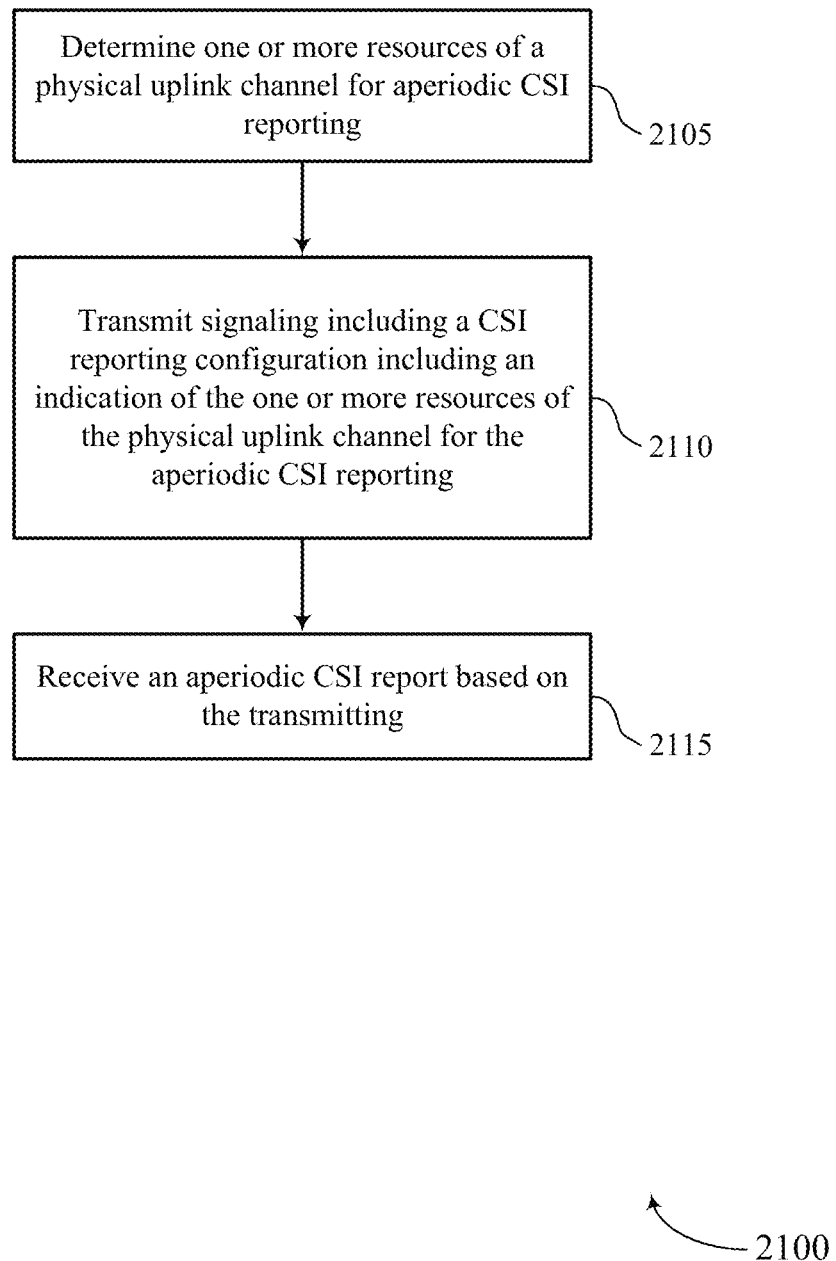

FIG. 21 shows a flowchart illustrating a method 2100 that supports PUSCH repetition with DMRS bundling in accordance with aspects of the present disclosure. The operations of method 2100 may be implemented by a base station 105 or its components as described herein. For example, the operations of method 2100 may be performed by a base station communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2105, the base station may determine one or more resources of a physical uplink channel for aperiodic CSI reporting. The operations of 2105 may be performed according to the methods described herein. In some examples, aspects of the operations of 2105 may be performed by a channel component as described with reference to FIGS. 16 through 19.

At 2110, the base station may transmit signaling including a CSI reporting configuration including an indication of the one or more resources of the physical uplink channel for the aperiodic CSI reporting. The operations of 2110 may be performed according to the methods described herein. In some examples, aspects of the operations of 2110 may be performed by a configuration component as described with reference to FIGS. 16 through 19.

At 2115, the base station may receive an aperiodic CSI report based on the transmitting. The operations of 2115 may be performed according to the methods described herein. In some examples, aspects of the operations of 2115 may be performed by a report component as described with reference to FIGS. 16 through 19.

Figure 22:
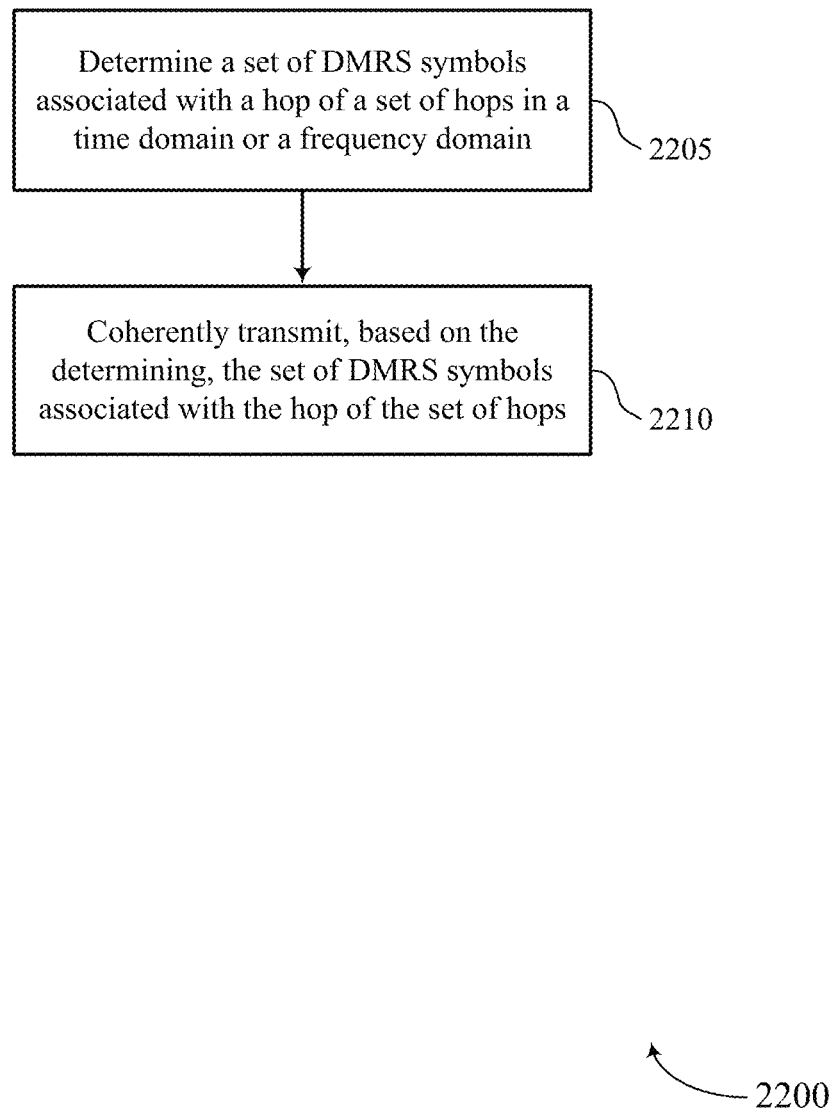

FIG. 22 shows a flowchart illustrating a method 2200 that supports PUSCH repetition with DMRS bundling in accordance with aspects of the present disclosure. The operations of method 2200 may be implemented by a UE 115 or its components as described herein. For example, the operations of method 2200 may be performed by a UE communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2205, the UE may determine a set of DMRS symbols associated with a hop of a set of hops in a time domain or a frequency domain. The operations of 2205 may be performed according to the methods described herein. In some examples, aspects of the operations of 2205 may be performed by a signal component as described with reference to FIGS. 12 through 15.

At 2210, the UE may coherently transmit, based on the determining, the set of DMRS symbols associated with the hop of the set of hops. The operations of 2210 may be performed according to the methods described herein. In some examples, aspects of the operations of 2210 may be performed by a group component as described with reference to FIGS. 12 through 15.

Figure 23:
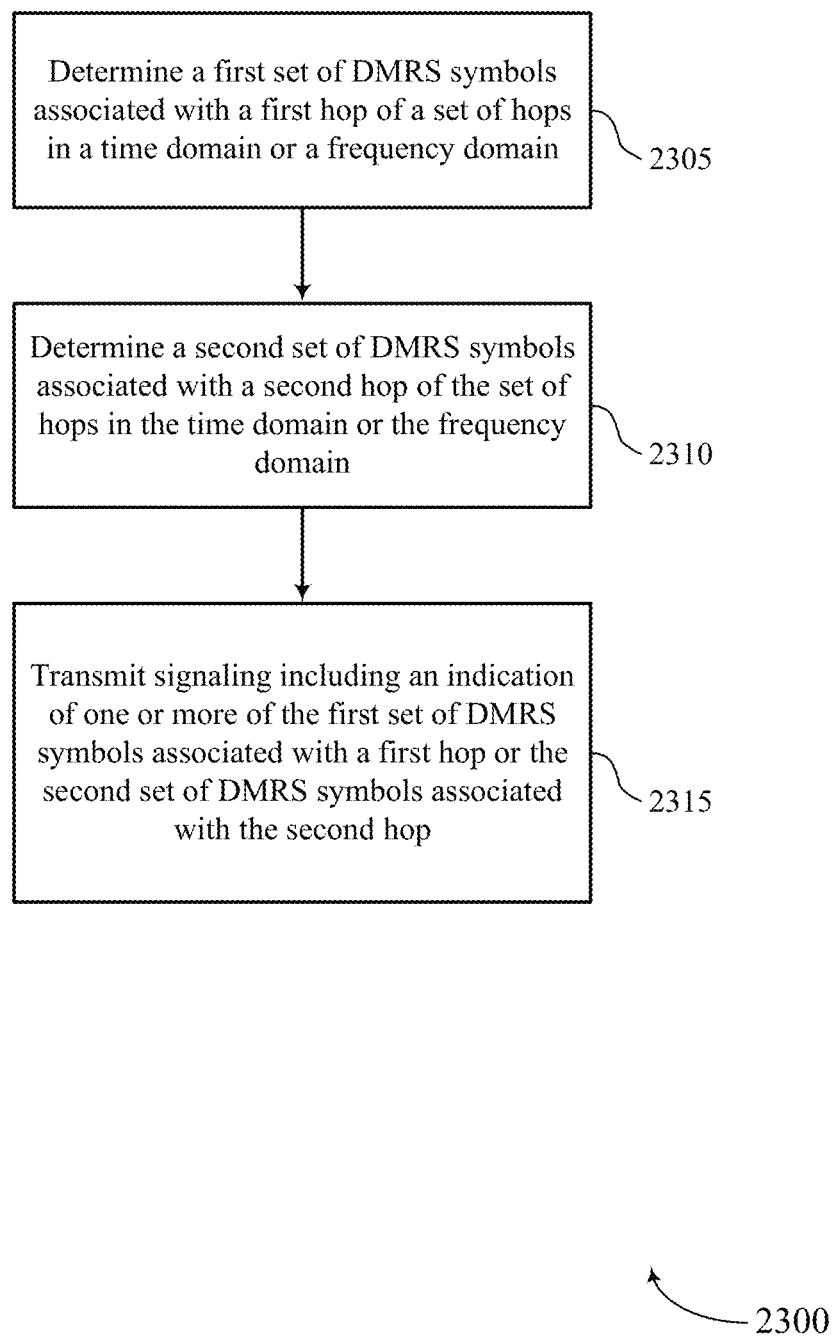

FIG. 23 shows a flowchart illustrating a method 2300 that supports PUSCH repetition with DMRS bundling in accordance with aspects of the present disclosure. The operations of method 2300 may be implemented by a base station 105 or its components as described herein. For example, the operations of method 2300 may be performed by a base station communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2305, the base station may determine a first set of DMRS symbols associated with a first hop of a set of hops in a time domain or a frequency domain. The operations of 2305 may be performed according to the methods described herein. In some examples, aspects of the operations of 2305 may be performed by a signal component as described with reference to FIGS. 16 through 19.

At 2310, the base station may determine a second set of DMRS symbols associated with a second hop of the set of hops in the time domain or the frequency domain. The operations of 2310 may be performed according to the methods described herein. In some examples, aspects of the operations of 2310 may be performed by a signal component as described with reference to FIGS. 16 through 19.

At 2315, the base station may transmit signaling including an indication of one or more of the first set of DMRS symbols associated with a first hop or the second set of DMRS symbols associated with the second hop. The operations of 2315 may be performed according to the methods described herein. In some examples, aspects of the operations of 2315 may be performed by a configuration component as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

Aspect 1: A method of wireless communication at a UE, comprising: receiving signaling including a CSI reporting configuration; determining one or more resources of a physical uplink channel for aperiodic CSI reporting based on the CSI reporting configuration; and transmitting an aperiodic CSI report over the physical uplink channel based on the on the one or more resources.

Aspect 2: The method of aspect 1, wherein the CSI reporting configuration includes one or more of a PUSCH repetition configuration or a PUSCH re-transmission configuration, the PUSCH repetition configuration comprising a number of PUSCH repetitions and a starting of a symbol in each slot associated with the number of PUSCH repetitions.

Aspect 3: The method of any of aspects 1 or 2, wherein the CSI reporting configuration comprises a PUSCH repetition configuration, and wherein determining the one or more resources of the physical uplink channel for the aperiodic CSI reporting includes determining the one or more resources of the physical uplink channel based at least in part on the PUSCH repetition configuration.

Aspect 4: The method of any of aspects 1 to 3, further comprising: determining a PUSCH repetition based at least in part on the PUSCH repetition configuration, wherein transmitting the aperiodic CSI report includes transmitting the aperiodic CSI report over the physical uplink channel according to the PUSCH repetition.

Aspect 5: The method of any of aspects 1 to 4, wherein the PUSCH repetition comprises a repetition of the physical uplink channel over the one or more resources comprising mini-slots or slots.

Aspect 6: The method of any of aspects 1 to 5, wherein the repetition of the physical uplink channel over the one or more resources is consecutive.

Aspect 7: The method of any of aspects 1 to 6, wherein the repetition of the physical uplink channel over the one or more resources is nonconsecutive.

Aspect 8: The method of any of aspects 1 to 7, further comprising: determining a payload size of the aperiodic CSI report; determining that the payload size of the aperiodic CSI report satisfies a threshold, wherein transmitting the aperiodic CSI report includes transmitting the aperiodic CSI over the physical uplink channel according to the PUSCH repetition configuration based at least in part on the payload size of the aperiodic CSI report satisfying the threshold.

Aspect 9: The method of any of aspects 1 to 8, wherein the threshold comprises a coding rate for the aperiodic CSI report.

Aspect 10: The method of any of aspects 1 to 9, further comprising: identifying a bit indication in a RRC configuration or in a downlink control information message; determining, based at least in part on the bit indication, a number of component carriers for the aperiodic CSI reporting and a repetition factor associated with the aperiodic CSI reporting, wherein transmitting the aperiodic CSI report includes transmitting the aperiodic CSI over the physical uplink channel according to the number of component carriers and the repetition factor.

Aspect 11: The method of any of aspects 1 to 10, wherein the bit indication comprises a multibit indication.

Aspect 12: The method of any of aspects 1 to 11, further comprising: receiving a control message comprising an indication of a component carrier for the aperiodic CSI report; determining a PUSCH repetition based at least in part on the PUSCH repetition configuration, wherein transmitting the aperiodic CSI report includes transmitting the aperiodic CSI report over the physical uplink channel on the component carrier according to the PUSCH repetition, wherein the PUSCH repetition is transmitted on the component carrier.

Aspect 13: The method of any of aspects 1 to 12, further comprising: receiving a control message comprising an indication of one or more component carriers for the aperiodic CSI report; determining a PUSCH repetition based at least in part on the PUSCH repetition configuration, wherein transmitting the aperiodic CSI report includes transmitting the aperiodic CSI report over the physical uplink channel on the one or more component carriers according to the PUSCH repetition, wherein a first PUSCH repetition is transmitted on a first component carrier of the one or more component carriers and a second PUSCH repetition is transmitted on a second component carrier of the one or more component carriers.

Aspect 14: The method of any of aspects 1 to 13, wherein the second component carrier is different from the first component carrier.

Aspect 15: The method of any of aspects 1 to 14, wherein the first component carrier and the second component carrier correspond to consecutive mini-slots or slots.

Aspect 16: The method of any of aspects 1 to 15, wherein the first component carrier and the second component carrier correspond to nonconsecutive mini-slots or slots.

Aspect 17: The method of any of aspects 1 to 16, wherein the channel state information reporting configuration comprises a PUSCH re-transmission configuration, and wherein determining the one or more resources of the physical uplink channel for the aperiodic channel state information reporting includes determining the one or more resources of the physical uplink channel based at least in part on the PUSCH re-transmission configuration.

Aspect 18: The method of any of aspects 1 to 17, further comprising: receiving a feedback message associated with the aperiodic channel state information report based at least in part on the transmitting; and retransmitting, based at least in part on the feedback message, the aperiodic channel state information report over the physical uplink channel according to the PUSCH re-transmission configuration.

Aspect 19: The method of any of aspects 1 to 18, further comprising: receiving a second signaling comprising a second channel state information reporting configuration for periodic channel state information reporting or semi-persistent channel state information reporting; and transmitting, based at least in part on the feedback message, a periodic channel state information report or a semi-persistent channel state information report according to the second channel state information reporting configuration.

Aspect 20: The method of any of aspects 1 to 19, further comprising: receiving a control message comprising an indication of a component carrier for the aperiodic channel state information report, wherein transmitting the aperiodic channel state information report includes transmitting the aperiodic channel state information report over the physical uplink channel and on the component carrier indicated in the control message.

Aspect 21: The method of any of aspects 1 to 20, further comprising: retransmitting, based at least in part on the feedback message, the aperiodic channel state information report on the component carrier indicated in the control message.

Aspect 22: The method of any of aspects 1 to 21, further comprising: retransmitting, based at least in part on the feedback message, the aperiodic channel state information report on a different component carrier from the component carrier indicated in the control message.

Aspect 23: The method of any of aspects 1 to 22, further comprising: determining to transmit the aperiodic channel state information report on the physical uplink channel based at least in part on the channel state information reporting configuration, the physical uplink channel comprising a PUSCH, wherein transmitting the aperiodic channel state information report includes transmitting the aperiodic channel state information report on the PUSCH based at least in part on the determining.

Aspect 24: The method of any of aspects 1 to 23, further comprising: determining that the PUSCH is configured to exclusively carry the aperiodic channel state information report based at least in part on the channel state information reporting configuration.

Aspect 25: The method of any of aspects 1 to 24, wherein transmitting the aperiodic channel state information report comprises: transmitting the aperiodic channel state information report exclusively on the PUSCH; and identifying that the UE is not configured with PUSCH repetition or PUSCH re-transmission, or both when the physical uplink channel is scheduled to carry the aperiodic channel state information report and a transport channel, wherein the transport channel comprises an UL-SCH; and refraining from transmitting the transport channel on the PUSCH based at least in part on the identifying.

Aspect 26: The method of any of aspects 1 to 25, further comprising: determining that the PUSCH is configured to jointly carry the aperiodic channel state information report and a transport channel, wherein the transport channel comprises an UL-SCH.

Aspect 27: The method of any of aspects 1 to 26, wherein transmitting the aperiodic channel state information report comprises: transmitting jointly the aperiodic channel state information report and the UL-SCH on the PUSCH.

Aspect 28: The method of any of aspects 1 to 27, wherein the signaling comprises RRC signaling.

Aspect 29: The method of any of aspects 1 to 28, wherein the signaling comprises downlink control signaling.

Aspect 30: The method of any of aspects 1 to 29, wherein the signaling comprises MAC-CE signaling.

Aspect 31: The method of any of aspects 1 to 30, wherein the one or more resources of the physical uplink channel comprises one or more mini-slots.

Aspect 32: The method of any of aspects 1 to 31, wherein the one or more resources of the physical uplink channel comprises one or more slots.

Aspect 33: A method of wireless communication at a base station, comprising: determining one or more resources of a physical uplink channel for aperiodic channel state information reporting; transmitting signaling comprising a channel state information reporting configuration including an indication of the one or more resources of the physical uplink channel for the aperiodic channel state information reporting; and receiving an aperiodic channel state information report based at least in part on the transmitting.

Aspect 34: The method of aspect 33, wherein the channel state information reporting configuration comprises one or more of a PUSCH repetition configuration or a PUSCH re-transmission configuration.

Aspect 35: The method of any of aspects 33 or 34, wherein the PUSCH repetition configuration corresponds to a PUSCH repetition associated with the physical uplink channel.

Aspect 36: The method of any of aspects 33 to 35, wherein the PUSCH repetition comprises a repetition of the PUSCH over the one or more resources comprising mini-slots or slots.

Aspect 37: The method of any of aspects 33 to 36, wherein the repetition of the PUSCH over the one or more resources is consecutive.

Aspect 38: The method of any of aspects 33 to 37, wherein the repetition of the PUSCH over the one or more resources is nonconsecutive.

Aspect 39: The method of any of aspects 33 to 38, further comprising: transmitting a control message comprising a second indication of one or more component carriers for the aperiodic channel state information report.

Aspect 40: The method of any of aspects 33 to 39, further comprising: transmitting a feedback message associated with the aperiodic channel state information report based at least in part on the receiving; and receiving a re-transmission of the aperiodic channel state information report based at least in part on the feedback message.

Aspect 41: The method of any of aspects 33 to 40, further comprising: transmitting a second signaling comprising a second channel state information reporting configuration for periodic channel state information reporting or semi-persistent channel state information reporting; and receiving, based at least in part on the feedback message, a periodic channel state information report or a semi-persistent channel state information report according to the second channel state information reporting configuration.

Aspect 42: The method of any of aspects 33 to 41, further comprising: transmitting a control message comprising a second indication of a component carrier for the aperiodic channel state information report, wherein receiving the aperiodic channel state information report includes receiving the aperiodic channel state information report on the component carrier indicated in the control message.

Aspect 43: The method of any of aspects 33 to 42, further comprising: receiving the aperiodic channel state information report exclusively on the PUSCH.

Aspect 44: The method of any of aspects 33 to 43, further comprising: receiving jointly the aperiodic channel state information report and an UL-SCH on the PUSCH.

Aspect 45: The method of any of aspects 33 to 44, wherein the signaling comprises RRC signaling.

Aspect 46: The method of any of aspects 33 to 45, wherein the signaling comprises downlink control signaling.

Aspect 47: The method of any of aspects 33 to 46, wherein the signaling comprises MAC-CE signaling.

Aspect 48: The method of any of aspects 33 to 47, wherein the one or more resources of the physical uplink channel comprises one or more mini-slots.

Aspect 49: The method of any of aspects 33 to 48, wherein the one or more resources of the physical uplink channel comprises one or more slots.

Aspect 50: A method for wireless communication at a UE, comprising: determining a set of DMRS symbols associated with a hop of a set of hops in a time domain or a frequency domain; and coherently transmitting, based at least in part on the determining, the set of DMRS symbols associated with the hop of the set of hops.

Aspect 51: The method of aspect 50, further comprising: receiving signaling comprising an indication of the set of DMRS symbols associated with the hop of the set of hops, wherein determining the set of DMRS symbols is based at least in part on the indication.

Aspect 52: The method of any of aspects 50 or 51, further comprising: determining a set of resources of one or more physical uplink channels associated with the hop of the set of hops in the time domain or the frequency domain.

Aspect 53: The method of any of aspects 50 to 52, further comprising: receiving signaling comprising an indication of the set of resources of the one or more physical uplink channels associated with the hop of the set of hops, wherein determining the set of resources of the one or more physical uplink channels associated with the hop of the set of hops is based at least in part on the indication, the set of resources comprising a set of symbols or a set of slots.

Aspect 54: The method of any of aspects 50 to 53, further comprising: determining a second set of DMRS symbols associated with a second hop of the set of hops in the time domain or the frequency domain; and coherently transmitting, based at least in part on the determining, the second set of DMRS symbols associated with the second hop of the set of hops.

Aspect 55: The method of any of aspects 50 to 54, further comprising: receiving signaling comprising an indication of the second set of DMRS symbols associated with the second hop of the set of hops, wherein determining the second set of DMRS symbols is based at least in part on the indication.

Aspect 56: The method of any of aspects 50 to 55, further comprising: determining a set of resources of one or more physical uplink channels associated with the second hop of the set of hops in the time domain or the frequency domain.

Aspect 57: The method of any of aspects 50 to 56, further comprising: receiving signaling comprising an indication of the set of resources of the one or more physical uplink channels associated with the second hop of the set of hops, wherein determining the set of resources of the one or more physical uplink channels associated with the second hop of the set of hops is based at least in part on the indication, the set of resources comprising a set of symbols or a set of slots.

Aspect 58: The method of any of aspects 50 to 57, wherein a quantity of resources of a set of resources of the one or more physical uplink channels associated with the hop of the set of hops and a quantity of resources of the set of resources of the one or more physical uplink channels associated with the second hop of the set of hops is different.

Aspect 59: The method of any of aspects 50 to 58, wherein a quantity of DMRSs of the set of DMRSs associated with the hop of the set of hops and a quantity of DMRSs of the second set of DMRSs associated with the second hop of the set of hops is different.

Aspect 60: The method of any of aspects 50 to 59, further comprising: determining a transmit power for one or more physical uplink channels associated with the hop of the set of hops; and transmitting the one more physical uplink channels associated with the hop of the set of hops according to the transmit power, wherein the transmit power is constant over the hop of the set of hops.

Aspect 61: The method of any of aspects 50 to 60, further comprising: determining a second transmit power for one or more physical uplink channels associated with a second hop of the set of hops; and transmitting the one more physical uplink channels associated with the second hop of the set of hops according to the second transmit power, wherein the second transmit power is constant over the second hop of the set of hops.

Aspect 62: The method of any of aspects 50 to 61, wherein the transmit power is different from the second transmit power.

Aspect 63: The method of any of aspects 50 to 62, further comprising: receiving signaling comprising an indication of a difference between the transmit power and the second transmit power.

Aspect 64: The method of any of aspects 50 to 63, wherein the signaling comprises RRC signaling.

Aspect 65: The method of any of aspects 50 to 64, wherein the signaling comprises system information signaling.

Aspect 66: The method of any of aspects 50 to 65, further comprising: determining a difference between the transmit power and the second transmit power based on a parameter.

Aspect 67: The method of any of aspects 50 to 66, further comprising: performing, based at least in part on an absence of a frequency hopping associated with the set of hops, a power ramping operation according to the difference between the transmit power and the second transmit power.

Aspect 68: A method for wireless communication at a base station, comprising: determining a first set of DMRS symbols associated with a first hop of a set of hops in a time domain or a frequency domain; determining a second set of DMRS symbols associated with a second hop of the set of hops in the time domain or the frequency domain; and transmitting signaling comprising an indication of one or more of the first set of DMRS symbols associated with a first hop or the second set of DMRS symbols associated with the second hop.

Aspect 69: The method of aspect 68, further comprising: determining a first set of resources of one or more physical uplink channels associated with the first hop of the set of hops; determining a second set of resources of one or more physical uplink channels associated with the second hop of the set of hops; and transmitting a second signaling comprising a second indication of one or more of the first set of resources of the one or more physical uplink channels associated with the first hop or the second set of resources of the one or more physical uplink channels associated with the second hop.

Aspect 70: The method of any of aspects 68 or 69, wherein a quantity of resources of the first set of resources of the one or more physical uplink channels associated with the first hop and a quantity of resources of the second set of resources of the one or more physical uplink channels associated with the second hop are different.

Aspect 71: The method of any of aspects 68 to 70, wherein a quantity of DMRS symbols of the first set of DMRS symbols associated with the first hop and a quantity of DMRS symbols of the second set of DMRS symbols associated with the second hop are different.

Aspect 72: The method of any of aspects 68 to 71, further comprising: transmitting signaling comprising an indication of a difference between a first transmit power associated with the first hop and a second transmit power associated with the second hop.

Aspect 73: The method of any of aspects 68 to 72, wherein the signaling comprises RRC signaling.

Aspect 74: The method of any of aspects 68 to 73, wherein the signaling comprises system information signaling.

Aspect 75: An apparatus comprising at least one means for performing a method of any of aspects 1 to 32.

Aspect 76: An apparatus for wireless communications comprising a processor; memory in electronic communication with the processor; and instructions stored in the memory and executable by the processor to cause the apparatus to perform a method of any of aspects 1 to 32.

Aspect 77: A non-transitory computer-readable medium storing code for wireless communications, the code comprising instructions executable by a processor to perform a method of any of aspects 1 to 32.

Aspect 78: An apparatus comprising at least one means for performing a method of any of aspects 33 to 49.

Aspect 79: An apparatus for wireless communications comprising a processor; memory in electronic communication with the processor; and instructions stored in the memory and executable by the processor to cause the apparatus to perform a method of any of aspects 33 to 49.

Aspect 80: A non-transitory computer-readable medium storing code for wireless communications, the code comprising instructions executable by a processor to perform a method of any of aspects 33 to 49.

Aspect 81: An apparatus comprising at least one means for performing a method of any of aspects 50 to 67.

Aspect 82: An apparatus for wireless communications comprising a processor; memory in electronic communication with the processor; and instructions stored in the memory and executable by the processor to cause the apparatus to perform a method of any of aspects 50 to 67.

Aspect 83: A non-transitory computer-readable medium storing code for wireless communications, the code comprising instructions executable by a processor to perform a method of any of aspects 50 to 67.

Aspect 84: An apparatus comprising at least one means for performing a method of any of aspects 68 to 74.

Aspect 85: An apparatus for wireless communications comprising a processor; memory in electronic communication with the processor; and instructions stored in the memory and executable by the processor to cause the apparatus to perform a method of any of aspects 68 to 74.

Aspect 86: A non-transitory computer-readable medium storing code for wireless communications, the code comprising instructions executable by a processor to perform a method of any of aspects 68 to 74.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving signaling comprising a channel state information reporting configuration, the channel state information reporting configuration comprising at least a physical uplink shared channel repetition configuration;
   determining one or more resources of a physical uplink channel for aperiodic channel state information reporting based at least in part on the channel state information reporting configuration; and
   transmitting a plurality of repetitions of an aperiodic channel state information report over the physical uplink channel based at least in part on the one or more resources, wherein, in accordance with the physical uplink shared channel repetition configuration, a first repetition of the aperiodic channel state information report is transmitted via a first component carrier and a second repetition of the aperiodic channel state information report is transmitted via a second component carrier.

2. The method of claim 1, wherein the physical uplink shared channel repetition configuration comprises a number of physical uplink shared channel repetitions and a starting of a symbol in each slot associated with the number of physical uplink shared channel repetitions.

3. The method of claim 2, wherein the channel state information reporting configuration comprises the physical uplink shared channel repetition configuration, and wherein determining the one or more resources of the physical uplink channel for the aperiodic channel state information reporting comprises:
   determining the one or more resources of the physical uplink channel based at least in part on the physical uplink shared channel repetition configuration.

4. The method of claim 3, further comprising:
   determining a physical uplink shared channel repetition based at least in part on the physical uplink shared channel repetition configuration, wherein transmitting the plurality of repetitions of the aperiodic channel state information report comprises:
   transmitting the plurality of repetitions of the aperiodic channel state information report over the physical uplink channel according to the physical uplink shared channel repetition,
   wherein the physical uplink shared channel repetition comprises a repetition of the physical uplink channel over the one or more resources comprising mini-slots or slots, and the repetition of the physical uplink channel over the one or more resources is consecutive or nonconsecutive.

5. The method of claim 3, further comprising:
   determining a payload size of the aperiodic channel state information report; and
   determining that the payload size of the aperiodic channel state information report satisfies a threshold, the threshold comprising a coding rate for the aperiodic channel state information report, wherein transmitting the plurality of repetitions of the aperiodic channel state information report comprises:
   transmitting the plurality of repetitions of the aperiodic channel state information report over the physical uplink channel according to the physical uplink shared channel repetition configuration based at least in part on the payload size of the aperiodic channel state information report satisfying the threshold.

6. The method of claim 3, further comprising:
   identifying a bit indication in a radio resource control configuration or in a downlink control information message, the bit indication comprising a multibit indication; and
   determining, based at least in part on the bit indication, a number of component carriers for the aperiodic channel state information reporting and a repetition factor associated with the aperiodic channel state information reporting, wherein transmitting the plurality of repetitions of the aperiodic channel state information report comprises:
   transmitting the plurality of repetitions of the aperiodic channel state information report over the physical uplink channel according to the number of component carriers and the repetition factor.

7. The method of claim 3, further comprising:
   receiving a control message comprising an indication of a component carrier for the aperiodic channel state information report, the component carrier comprising the first component carrier or the second component carrier; and determining a physical uplink shared channel repetition based at least in part on the physical uplink shared channel repetition configuration, wherein transmitting the plurality of repetitions of the aperiodic channel state information report comprises:
  transmitting one or more repetitions of the aperiodic channel state information report over the physical uplink channel on the component carrier according to the physical uplink shared channel repetition, wherein the physical uplink shared channel repetition is transmitted on the component carrier.

8. The method of claim 3, further comprising:
receiving a control message comprising an indication of one or more component carriers for the aperiodic channel state information report, the one or more component carriers comprising at least the first component carrier and the second component carrier; and
determining a physical uplink shared channel repetition based at least in part on the physical uplink shared channel repetition configuration, wherein transmitting the plurality of repetitions of the aperiodic channel state information report comprises:
  transmitting the plurality of repetitions of the aperiodic channel state information report on the one or more component carriers according to the physical uplink shared channel repetition configuration, wherein the first component carrier and the second component carrier correspond to consecutive mini-slots or slots, or nonconsecutive mini-slots or slots.

9. The method of claim 1, wherein the channel state information reporting configuration comprises a physical uplink shared channel re-transmission configuration, and wherein determining the one or more resources of the physical uplink channel for the aperiodic channel state information reporting comprises:
  determining the one or more resources of the physical uplink channel based at least in part on the physical uplink shared channel re-transmission configuration.

10. The method of claim 9, further comprising:
receiving a feedback message associated with the aperiodic channel state information report based at least in part on the transmitting; and
retransmitting, based at least in part on the feedback message, the aperiodic channel state information report over the physical uplink channel according to the physical uplink shared channel re-transmission configuration.

11. The method of claim 10, further comprising:
receiving a second signaling comprising a second channel state information reporting configuration for periodic channel state information reporting or semi-persistent channel state information reporting; and
transmitting, based at least in part on the feedback message, a periodic channel state information report or a semi-persistent channel state information report according to the second channel state information reporting configuration.

12. The method of claim 10, further comprising:
receiving a control message comprising an indication of a component carrier for the aperiodic channel state information report, the component carrier comprising the first component carrier or the second component carrier, wherein transmitting the plurality of repetitions of the aperiodic channel state information report comprises:
  transmitting the plurality of repetitions of the aperiodic channel state information report over the physical uplink channel and on the component carrier indicated in the control message; and
  retransmitting, based at least in part on the feedback message, the aperiodic channel state information report on the component carrier indicated in the control message or on a different component carrier from the component carrier indicated in the control message.

13. The method of claim 1, further comprising:
determining to transmit the aperiodic channel state information report on the physical uplink channel based at least in part on the channel state information reporting configuration, the physical uplink channel comprising a physical uplink shared channel, wherein transmitting the plurality of repetitions of the aperiodic channel state information report comprises:
  transmitting the plurality of repetitions of the aperiodic channel state information report on the physical uplink shared channel based at least in part on the determining.

14. The method of claim 13, further comprising:
determining that the physical uplink shared channel is configured to exclusively carry the aperiodic channel state information report based at least in part on the channel state information reporting configuration;
transmitting the plurality of repetitions of the aperiodic channel state information report exclusively on the physical uplink shared channel;
identifying that the UE is not configured with physical uplink shared channel repetition or physical uplink shared channel re-transmission, or both, when the physical uplink channel is scheduled to carry the aperiodic channel state information report and a transport channel, wherein the transport channel comprises an uplink shared channel; and
refraining from transmitting the transport channel on the physical uplink shared channel based at least in part on the identifying.

15. The method of claim 1, further comprising:
determining that the physical uplink channel is configured to jointly carry the aperiodic channel state information report and a transport channel, wherein the transport channel comprises an uplink shared channel, wherein transmitting the plurality of repetitions of the aperiodic channel state information report comprises:
  transmitting jointly the aperiodic channel state information report and the uplink shared channel on the physical uplink channel.

16. The method of claim 1, wherein:
the signaling comprises radio resource control signaling, downlink control signaling, or medium access control-control element signaling, or a combination thereof; and
the one or more resources of the physical uplink channel comprises mini-slots or slots, or a combination thereof.

17. A method for wireless communication at a base station, comprising:
determining one or more resources of a physical uplink channel for aperiodic channel state information reporting based at least in part on a channel state information reporting configuration;
transmitting signaling comprising the channel state information reporting configuration, the channel state information reporting configuration comprising a physical uplink shared channel repetition configuration; and
receiving a plurality of repetitions of an aperiodic channel state information report based at least in part on the transmitting, wherein, in accordance with the physical uplink shared channel repetition configuration, a first repetition of the aperiodic channel state information report is received via a first component carrier and a second repetition of the aperiodic channel state information report is received via a second component carrier.

18. A user equipment (UE), comprising:

one or more memories storing processor-executable code; and one or more processors coupled with the one or more memories and individually or collectively operable to execute the code to cause the UE to:

receive signaling comprising a channel state information reporting configuration, the channel state information reporting configuration comprising at least a physical uplink shared channel repetition configuration;

determine one or more resources of a physical uplink channel for aperiodic channel state information reporting based at least in part on the channel state information reporting configuration; and transmit a plurality of repetitions of an aperiodic channel state information report over the physical uplink channel based at least in part on the one or more resources, wherein, in accordance with the physical uplink shared channel repetition configuration, a first repetition of the aperiodic channel state information report is transmitted via a first component carrier and a second repetition of the aperiodic channel state information report is transmitted via a second component carrier.

19. The UE of claim 18, wherein the physical uplink shared channel repetition configuration comprises a number of physical uplink shared channel repetitions and a starting of a symbol in each slot associated with the number of physical uplink shared channel repetitions.

20. The UE of claim 19, wherein the channel state information reporting configuration comprises the physical uplink shared channel repetition configuration, and wherein the one or more resources of the physical uplink channel for the aperiodic channel state information reporting is determined based at least in part on the physical uplink shared channel repetition configuration.

* * * * *